(12) United States Patent
Esclamada

(10) Patent No.: US 9,281,939 B2
(45) Date of Patent: *Mar. 8, 2016

(54) METHOD AND SYSTEM FOR ENCRYPTING DATA DELIVERED OVER A NETWORK

(75) Inventor: Arthur G. Esclamada, Kansas City, MO (US)

(73) Assignee: Adknowledge, Inc., Kansas City, MO (US)

(*) Notice: Subject to any disclaimer, the term of this patent is extended or adjusted under 35 U.S.C. 154(b) by 761 days.

This patent is subject to a terminal disclaimer.

(21) Appl. No.: 13/529,216

(22) Filed: Jun. 21, 2012

(65) Prior Publication Data

US 2012/0265986 A1 Oct. 18, 2012

Related U.S. Application Data

(63) Continuation of application No. 11/449,135, filed on Jun. 8, 2006, now Pat. No. 8,209,222.

(60) Provisional application No. 60/725,784, filed on Oct. 12, 2005.

(51) Int. Cl.
| | |
|---|---|
| H04L 9/00 | (2006.01) |
| G06Q 10/10 | (2012.01) |
| G06Q 30/02 | (2012.01) |
| H04L 29/06 | (2006.01) |
| H04L 12/58 | (2006.01) |
| H04L 9/08 | (2006.01) |

(52) U.S. Cl.
CPC ............. *H04L 9/00* (2013.01); *G06Q 10/107* (2013.01); *G06Q 30/0241* (2013.01); *G06Q 30/0251* (2013.01); *G06Q 30/0277* (2013.01); *H04L 9/083* (2013.01); *H04L 51/28* (2013.01); *H04L 63/0414* (2013.01); *H04L 2209/60* (2013.01)

(58) Field of Classification Search
CPC ....... H04L 9/083; H04L 9/00; H04L 63/0414; H04L 63/0236; G06Q 10/107
See application file for complete search history.

(56) References Cited

U.S. PATENT DOCUMENTS

| | | | |
|---|---|---|---|
| 4,276,597 | A | 6/1981 | Dissly et al. |
| 5,541,835 | A | 7/1996 | Dextraze et al. |
| 5,608,621 | A | 3/1997 | Caveney et al. |

(Continued)

FOREIGN PATENT DOCUMENTS

| | | | |
|---|---|---|---|
| EP | 0869652 | A | 10/1998 |
| WO | 0137123 | A | 5/2001 |

OTHER PUBLICATIONS

Liu, Peng, Guojun Dai, and Tingting Fu. "A Web services based Email Extension for Remote Monitoring of Embedded Systems." Software Engineering, Artificial Intelligence, Networking, and Parallel/Distributed Computing, 2007. SNPD 2007. Eighth ACIS International Conference on. vol. 2. pp. 412-416. IEEE, 2007.*

(Continued)

*Primary Examiner* — Kari Schmidt
(74) *Attorney, Agent, or Firm* — Meunier Carlin & Curfman LLC

(57) ABSTRACT

Systems and methods are provided for delivering e-mail, typically with time relevant content, to users, whose e-mail addresses are encrypted. Specifically, the e-mails are administered by a host or home server that is transparent to the e-mail addresses of the computers and e-mail clients, that electronic communications are being sent to and received from.

25 Claims, 14 Drawing Sheets

(56) References Cited

U.S. PATENT DOCUMENTS

| | | | |
|---|---|---|---|
| 5,701,451 A | 12/1997 | Rogers et al. | |
| 5,717,923 A | 2/1998 | Dedrick | |
| 5,724,521 A | 3/1998 | Dedrick | |
| 5,751,956 A | 5/1998 | Kirsch | |
| 5,774,868 A | 6/1998 | Cragun et al. | |
| 5,812,997 A | 9/1998 | Morimoto | |
| 5,826,269 A | 10/1998 | Hussey | |
| 5,918,014 A | 6/1999 | Robinson | |
| 5,937,392 A | 8/1999 | Alberts | |
| 5,963,910 A | 10/1999 | Ulwick | |
| 5,974,398 A | 10/1999 | Hanson | |
| 5,983,227 A | 11/1999 | Nazem | |
| 5,991,735 A | 11/1999 | Gerace | |
| 6,006,197 A | 12/1999 | D'Eon | |
| 6,009,407 A | 12/1999 | Garg | |
| 6,026,368 A | 2/2000 | Brown | |
| 6,049,777 A | 4/2000 | Sheena | |
| 6,075,535 A | 6/2000 | Fitzhugh | |
| 6,078,892 A | 6/2000 | Anderson | |
| 6,115,691 A | 9/2000 | Ulwick | |
| 6,128,624 A | 10/2000 | Papierniak | |
| 6,134,532 A | 10/2000 | Lazarus | |
| 6,144,944 A | 11/2000 | Kurtzman, II | |
| 6,151,584 A | 11/2000 | Papierniak | |
| 6,189,030 B1 | 2/2001 | Kirsch | |
| 6,199,106 B1 | 3/2001 | Shaw et al. | |
| 6,205,432 B1 | 3/2001 | Gabbard et al. | |
| 6,208,975 B1 | 3/2001 | Bull | |
| 6,216,129 B1 | 4/2001 | Eldering | |
| 6,236,977 B1 | 5/2001 | Verbra | |
| 6,298,356 B1 | 10/2001 | Jawahar et al. | |
| 6,321,209 B1 | 11/2001 | Pasquali | |
| 6,360,221 B1 | 3/2002 | Gough et al. | |
| 6,363,383 B1 | 3/2002 | Kindo | |
| 6,411,961 B1 | 6/2002 | Chen | |
| 6,415,294 B1 | 7/2002 | Niemi | |
| 6,448,958 B1 | 9/2002 | Muta et al. | |
| 6,449,635 B1 | 9/2002 | Tilden, Jr. et al. | |
| 6,460,036 B1 | 10/2002 | Herz | |
| 6,477,575 B1 | 11/2002 | Koeppel | |
| 6,490,584 B2 | 12/2002 | Barrett | |
| 6,553,373 B2 | 4/2003 | Boguraev et al. | |
| 6,601,041 B1 | 7/2003 | Brown | |
| 6,615,212 B1 | 9/2003 | Dutta | |
| 6,618,718 B1 | 9/2003 | Couch | |
| 6,622,125 B1 | 9/2003 | Cragun | |
| 6,654,748 B1 | 11/2003 | Rabung | |
| 6,662,215 B1 | 12/2003 | Moskowitz | |
| 6,721,784 B1 | 4/2004 | Leonard | |
| 6,778,989 B2 | 8/2004 | Bates | |
| 6,801,945 B2 | 10/2004 | Lin | |
| 6,823,320 B1 | 11/2004 | Rubin | |
| 6,839,736 B1 | 1/2005 | Kajita et al. | |
| 6,850,252 B1 | 2/2005 | Hoffberg | |
| 6,868,395 B1 | 3/2005 | Szlam | |
| 6,868,525 B1 | 3/2005 | Szabo | |
| 6,876,974 B1 | 4/2005 | Marsh | |
| 6,883,014 B1 | 4/2005 | McErlean | |
| 6,892,238 B2 | 5/2005 | Lee | |
| 6,904,450 B1 | 6/2005 | King | |
| 6,904,521 B1* | 6/2005 | Jivsov | H04L 12/5875 713/155 |
| 6,912,571 B1 | 6/2005 | Serena | |
| 6,915,271 B1 | 7/2005 | Meyer | |
| 6,934,687 B1 | 8/2005 | Papierniak | |
| 6,938,000 B2 | 8/2005 | Joseph | |
| 6,938,050 B2 | 8/2005 | Le | |
| 6,944,611 B2 | 9/2005 | Flank | |
| 6,944,817 B1 | 9/2005 | Danneels | |
| 6,954,731 B1 | 10/2005 | Montague | |
| 6,959,306 B2 | 10/2005 | Nwabueze | |
| 6,968,333 B2 | 11/2005 | Abbott et al. | |
| 6,970,830 B1 | 11/2005 | Samra | |
| 6,973,436 B1 | 12/2005 | Shkedi | |
| 6,988,096 B2 | 1/2006 | Gupta et al. | |
| 7,006,979 B1 | 2/2006 | Samra | |
| 7,006,981 B2 | 2/2006 | Rose | |
| 7,013,285 B1 | 3/2006 | Rebane | |
| 7,050,990 B1 | 5/2006 | Chu | |
| 7,080,030 B2 | 7/2006 | Eglen | |
| 7,103,563 B1 | 9/2006 | Voisin et al. | |
| 7,149,893 B1 | 12/2006 | Leonard et al. | |
| 7,299,409 B2 | 11/2007 | Joshi | |
| 7,493,499 B1 | 2/2009 | Deaver | |
| 7,580,980 B2 | 8/2009 | Kawashima | |
| 7,599,852 B2 | 10/2009 | Bosarge | |
| 7,647,387 B2 | 1/2010 | Bellare | |
| 7,702,107 B1* | 4/2010 | Messing | 380/259 |
| 7,921,292 B1* | 4/2011 | Pauker et al. | 713/171 |
| 2001/0029465 A1 | 10/2001 | Strisower | |
| 2001/0037242 A1 | 11/2001 | Bataillon | |
| 2001/0044745 A1 | 11/2001 | Shaw | |
| 2002/0010746 A1 | 1/2002 | Jilk, Jr. et al. | |
| 2002/0013785 A1 | 1/2002 | Miyazaki | |
| 2002/0026360 A1 | 2/2002 | McGregor et al. | |
| 2002/0032602 A1 | 3/2002 | Lanzillo, Jr. et al. | |
| 2002/0035568 A1 | 3/2002 | Benthin | |
| 2002/0065850 A1 | 5/2002 | Baudu | |
| 2002/0083140 A1 | 6/2002 | Shin | |
| 2002/0087631 A1 | 7/2002 | Sharma | |
| 2002/0107931 A1 | 8/2002 | Singh et al. | |
| 2002/0111863 A1 | 8/2002 | Landesmann | |
| 2002/0112013 A1 | 8/2002 | Walsh | |
| 2002/0116476 A1 | 8/2002 | Eyal et al. | |
| 2002/0120589 A1 | 8/2002 | Aoki | |
| 2002/0129002 A1 | 9/2002 | Alberts et al. | |
| 2003/0004882 A1 | 1/2003 | Holler et al. | |
| 2003/0005052 A1 | 1/2003 | Feuer | |
| 2003/0033420 A1 | 2/2003 | Eyal et al. | |
| 2003/0037041 A1 | 2/2003 | Hertz | |
| 2003/0083937 A1 | 5/2003 | Hasegawa | |
| 2003/0115099 A1 | 6/2003 | Burns et al. | |
| 2003/0163370 A1 | 8/2003 | Chen | |
| 2003/0171990 A1 | 9/2003 | Rao | |
| 2003/0191689 A1 | 10/2003 | Bosarge et al. | |
| 2003/0195802 A1 | 10/2003 | Hensen | |
| 2003/0233409 A1 | 12/2003 | Awada et al. | |
| 2004/0059712 A1 | 3/2004 | Dean et al. | |
| 2004/0059788 A1 | 3/2004 | Marcus | |
| 2004/0098465 A1 | 5/2004 | Seo | |
| 2004/0122730 A1 | 6/2004 | Tucciarone et al. | |
| 2004/0128293 A1 | 7/2004 | Maeda | |
| 2004/0150673 A1 | 8/2004 | Dobronsky | |
| 2004/0189699 A1 | 9/2004 | Dobronsky | |
| 2004/0199657 A1 | 10/2004 | Eyal et al. | |
| 2004/0215479 A1 | 10/2004 | Dorsey et al. | |
| 2004/0225562 A1 | 11/2004 | Turner | |
| 2004/0249709 A1 | 12/2004 | Donovan et al. | |
| 2005/0005028 A1 | 1/2005 | Huang | |
| 2005/0038861 A1 | 2/2005 | Lynn | |
| 2005/0076051 A1 | 4/2005 | Carobus | |
| 2005/0108343 A1 | 5/2005 | Collet et al. | |
| 2005/0114198 A1 | 5/2005 | Koningstein | |
| 2005/0114345 A1 | 5/2005 | Wesinger, Jr. | |
| 2005/0198170 A1 | 9/2005 | LeMay et al. | |
| 2006/0010324 A1* | 1/2006 | Appenzeller et al. | 713/171 |
| 2006/0026497 A1 | 2/2006 | Haenlein | |
| 2006/0036608 A1 | 2/2006 | Gutierrez | |
| 2006/0122883 A1 | 6/2006 | Lynn | |
| 2006/0129629 A1 | 6/2006 | Kawashima et al. | |
| 2006/0242411 A1 | 10/2006 | Lin | |
| 2007/0079114 A1* | 4/2007 | Seemann | 713/153 |
| 2007/0244977 A1 | 10/2007 | Atkins | |
| 2008/0140608 A1 | 6/2008 | Takahashi et al. | |
| 2009/0132276 A1 | 5/2009 | Petera | |

OTHER PUBLICATIONS

Mazieres, David, and M. Frans Kaashoek. "The design, implementation and operation of an email pseudonym server." Proceedings of the 5th ACM Conference on Computer and Communications Security. (pp. 27-36). ACM, 1998.*

Henry, Paul, and Hui Luo. "Off-the-record email system." INFOCOM 2001. Twentieth Annual Joint Conference of the IEEE

(56) References Cited

OTHER PUBLICATIONS

Computer and Communications Societies. Proceedings. IEEE. vol. 2.pp. 869-877. IEEE, 2001.*
Rivest, The MD5 Message-Digest Algorithm, Apr. 1992, retrieved from the Internet at http://www.ietf.org/rfc/rfc1321.txt.
Blowfish (cipher), Wikipedia, the free encyclopedia, retrieved from the Internet at http://en.wikipedia.org/wiki/Blowfish_(cipher) on Jun. 6, 2006.
Non-Final Office Action dated Dec. 23, 2008 issued in U.S. Appl. No. 10/915,975, 12 pages.
Amendment and Response to First (Non-Final) Office Action filed on Jun. 19, 2009 in U.S. Appl. No. 10/915/975, 22 pages.
Final Office Action dated Oct. 15, 2009 issued in U.S. Appl. No. 10/915,975, 15 pages.
Amendment and Response to Final Office Action filed on Jan. 15, 2010 in U.S. Appl. No. 10/915,075, 26 pages.
Non-final Office Action dated Mar. 2, 2010 issued in U.S. Appl No. 10/915,975, 14 pages.
Interview Summary, Amendment and Response to Non-Final Office Action filed on Sep. 2, 2010 in U.S. Appl. No. 10/915,075, 30 pages.
Notice of Allowance for U.S. Appl. No. 11/294,188, dated Dec. 28, 2011,16 pages.
Notice of Allowance for U.S. Appl. No. 11/294,188, dated Aug. 12, 2011, 20 pages.
Notice of Allowance for U.S. Appl. No. 11/294,188, dated Apr. 27, 2011, 30 pages.
Notice of Allowance for U.S. Appl. No. 11/294,188, dated Dec. 23, 2010, 18 pages.
Notice of Allowance for U.S. Appl. No. 11/294,188, dated Sep. 1, 2010, 19 pages.
Office Action for U.S. Appl. No. 11/294,188, dated Dec. 21, 2009, 61 pages.
Office Action for U.S. Appl. No. 11/101,857 dated Jun. 13, 2011, 45 pages.
Office Action for U.S. Appl. No. 11/101,857 dated Oct. 13, 2010, 18 pages.
Office Action for U.S. Appl. No. 11/101,857 dated Jan. 4, 2010, 22 pages.
Office Action for U.S. Appl. No. 12/647,749 dated Aug. 5, 2011, 20 pages.
Office Action for U.S. Appl. No. 12/647,749 dated Dec. 1, 2010, 16 pages.
Office Action for U.S. Appl. No. 10/915,975, dated Nov. 23, 2010, 19 pages.
Office Action for U.S. Appl. No. 10/915,975, dated Jun. 15, 2011, 20 pages.
Office Action for U.S. Appl. No. 11/294,188 dated May 21, 2009, 41 pages.
Office Action for U.S. Appl. No. 11/101,857 dated May 29, 2009, 18 pages.
Office Action for U.S. Appl. No. 11/294,188 dated Aug. 15, 2008, 33 pages.
Office Action for U.S. Appl. No. 11/101,857 dated Sep. 4, 2008, 24 pages.
Weiguang, Shao et al., "An Agent Architecture for Supporting Individualized Services in Internet Applications", Tools With Artificial Intelligence, 1998. Proceedings Tenth IEEE International Conference in Taipei, Taiwan Nov. 10-12, 1998, Piscatawa, NJ, USA, IEEE, US Nov. 10, 1998, p. 140-147.
EP Search Report dated Mar. 13, 2006, 5 pages.
Office Action for U.S. Appl. No. 10/915,975, dated Feb. 24, 2012, 22 pages.

* cited by examiner

KEY 1
E-MAIL ID : 10123
KEYWORD : NEW CARS
MAILING ID : 4567

KEY 2
E-MAIL ID : 10791
KEYWORD : NEW CARS
MAILING ID : 4567

KEY 3
E-MAIL ID : 12828
KEYWORD : MORTGAGE
MAILING ID : 4608

KEY 4
E-MAIL ID : 17401
KEYWORD : DIET
MAILING ID : 4724

METHOD AND SYSTEM FOR ENCRYPTING DATA DELIVERED OVER A NETWORK

RELATED APPLICATIONS

This application is a continuation application of commonly owned U.S. patent application Ser. No. 11/449,135, entitled: METHOD AND SYSTEM FOR ENCRYPTING DATA DELIVERED OVER A NETWORK, filed on Jun. 8, 2006, now U.S. Pat. No. 8,209,222, which is related to commonly owned U.S. Provisional Patent Application Ser. No. 60/725,784, entitled: METHOD AND SYSTEM FOR ENCRYPTING DATA DELIVERED OVER A NETWORK, filed on Oct. 12, 2005. U.S. patent application Ser. No. 11/449,135 and U.S. Provisional Patent Application Ser. No. 60/725,784 are both incorporated by reference herein.

TECHNICAL FIELD

The present invention relates to encrypting data delivered over a network. In particular, the present invention is directed to encrypting data while allowing users to dynamically submit and retrieve data from a home or host server, or components associated therewith. The data typically includes electronic mail, commonly known as e-mail, as sent over a network, such as the Internet, with its content generated when the recipient opens the requisite electronic mail.

BACKGROUND

Businesses and consumers are increasingly turning to the Internet to communicate, survey, and transact business among themselves and with each other. The size, volume and complexity of these communications and transactions has been steadily increasing as the Internet has become, over the years, an increasingly accepted medium for use by businesses and consumers. In particular, the Internet facilitates various types of electronic communications between computers linked thereto, and specifically, the users associated therewith.

Electronic communications have dramatically changed the ways in which people communicate. Electronic mail, commonly referred to as e-mail, is a widely used form of electronic communication. E-mail is the exchange of computer-stored messages by telecommunication, over a network, such as the Internet. E-mail accounts for the largest percentage of total traffic on the Internet. E-mail usage is expected to increase exponentially in the next few years as increasing numbers of people have access to computers, and therefore, the World Wide Web (WWW).

E-mail communications are desirable, as they are current, usually in real time, and are non-intrusive. Conversely, a telephone call is intrusive, as it must be attended to at the moment it is received, and may interfere with the recipient's activities. The e-mail recipient may open the e-mail when desired, and may delete the e-mail without reading it.

E-mail distribution to individuals and organizations is quick and economical. Senders create recipient lists, that may include thousands of recipients. Recipient e-mail addresses can be added and deleted from the lists as desired. The e-mail is composed once and sent to multitudes of recipients, all of whom receive the e-mail instantaneously. The e-mail can be duplicated and sent to recipients from another recipient list, typically in the matter of minutes.

Identity theft and related fraud have also grown with the seeming ubiquity of the Internet as a convenient communications medium. A U.S. Federal Trade Commission study, focusing only on identity theft, estimates that nearly 10 million adult citizens were victims of identity theft in the U.S. in 2003, resulting in business losses of over $47 billion and consumer losses of about $5 billion. Synovate, Federal Trade Commission: Identity Theft Survey Report at Page 7, Table 2 (September 2003). In general and aside from the specific issue of identity theft, businesses increasingly prefer to protect their customer data or are regulated by law, depending on the industry, in how they may share personally identifiable information from their customers with third parties.

Businesses have sought to address the preference or obligation to secure confidentiality of their customer data, in whole or in part, through a variety of methods. For example, people and businesses regularly use one or more of the following security measures to try protecting electronic data they consider sensitive. Password protection may be used to permit access to or retrieval of sensitive data. Data may be destroyed periodically, or it may be centralized at a location secured both physically and electronically. These technologies tend to trade-off effectiveness for utility. That is, the tendency is that the more effective a protection regime is, the greater the transaction costs of accessing the data and the less the data tends to be utilized. The easier it is to access data, for example through weak encryption or standardized and infrequently changed password access, the more the data may be utilized but the greater the risk of its theft or misuse.

In addition, traditional encryption technology applied to a database generally works with a single decryption key, which is reasonable in a two party relationship where one party hosts the database and encrypts the data (and perhaps utilizes it), while the other party deposits and retrieves the data for utilization. However, such technology tends to be ineffective in securing a database to which multiple parties deposit and retrieve encrypted data. Since there is only one decryption key to the entire database, the multiple parties will each have access to all the contents of the database, not just the data which they store in the database. To work around this shortcoming, it is possible to set up different databases for each customer. This solution, however, is more costly and inefficient than having a single database with multiple decryption keys, each one of which is unique to each customer with access to the database.

SUMMARY

The present invention overcomes the drawbacks of contemporary systems and methods, as it provides systems and methods for delivering e-mail, typically with time relevant content, to users, whose e-mail addresses are encrypted. Specifically, the e-mails are administered by a host or home server that is transparent to the e-mail addresses of the computers and e-mail clients, that electronic communications are being sent to and received from. Accordingly, the host or home server processes requests and delivers content to e-mails in a transparent manner, as the actual address of the recipient is not known to the host or home server. Similarly, the address of the e-mail associated with the browser, redirected to a target web site, once a link in the e-mail has been activated, remains unknown to the host or home server, that facilitates the redirection to this target web site.

An embodiment of the invention is directed to a method for providing content into electronic communications. The method includes, receiving encrypted data corresponding to an address of a recipient, and providing an electronic communication, that has the encrypted data and a communication identifier corresponding to the encrypted data. The encrypted data is decrypted to obtain the address of the machine associated with the recipient and sent to the machine, whose address has been decrypted. The machine is associated with the communication identifier of the electronic communication. When at least one indicator that the electronic communication has been opened by the machine associated with the communication identifier is received, content is provided to the opened electronic communication. The electronic communication is, for example, electronic mail (e-mail).

Another embodiment is directed to a method for providing content into electronic communications. The method includes, receiving encrypted address data corresponding to a recipient, and creating an electronic communication, for example, an electronic mail (e-mail) including the encrypted address data. The electronic communication including the encrypted address data is then sent for decryption, for sending the electronic communication to the address of the recipient. An indicator that the electronic communication was opened is received and a connection or "pipe" between the machine associated with the opened electronic communication and a content obtaining device is opened. Content is provided to the opened electronic communication through the connection.

Another embodiment is directed to a system for providing content to electronic communications, for example, electronic mail (e-mail). The system includes a device with a first component for receiving encrypted address data corresponding to a recipient (user) linked to the network (e.g., the Internet), and providing the encrypted address data to an electronic communication. There is a second component for creating electronic communications including the encrypted address data, and for sending the electronic communication including the encrypted address data, for decryption, for sending the electronic communication to the address of the recipient. A third component obtains content for opened electronic communications, and, a fourth component for receives an indicator that the electronic communication was opened, and subsequently opens a connection or "pipe" between the machine associated with the opened e-mail and the third component, such that content is obtained for the opened electronic communication through the connection. The system also includes an encryption application, and a decryption application, for the encryption application, typically located on or associated with servers, that are linked, via the network, to the device.

Another embodiment is directed to a computer-usable storage medium having a computer program embodied thereon. The storage medium causes a suitably programmed system to provide content to electronic communications, for example, electronic mails (e-mails), by performing the following steps, when such program is executed on the system. The steps include, receiving encrypted address data corresponding to a recipient, and creating an electronic communication including the encrypted address data. This is followed by sending the electronic communication including the encrypted address data, for decryption, for sending the electronic communication to the address of the recipient. The step of receiving an indicator that the electronic communication was opened, is followed by the step of opening a connection between the machine associated with the opened electronic communication and a content obtaining device. In the next step, content is provided to the opened electronic communication through the connection. In an additional step, the connection between the machine and the content obtaining device is closed, when the body of the opened electronic communication has been built. The step of step of providing content to the electronic communication includes obtaining listings based on at least one key word, and providing redirect uniform locators (URLs) to target web sites associated with each listing, when the redirect uniform resource locator (URL) is activated.

BRIEF DESCRIPTION OF THE DRAWINGS

Attention is now directed to the drawings, where like reference numerals or characters indicate corresponding or like components. In the drawings:

FIG. 6 is a diagram of a key cache in accordance with an embodiment of the invention;

DETAILED DESCRIPTION OF THE DRAWINGS

The present invention is related to systems and methods for delivering electronic communications, typically electronic mail, commonly known as e-mail, typically with time relevant content, to users, whose e-mail addresses are encrypted. Specifically, the e-mails are administered by a host or home server that is transparent to the e-mail addresses of the computers and e-mail clients that electronic communications are being sent to and received from. As a result of this transparency, the actual identities, i.e., e-mail addresses, of the users associated with the requisite e-mail clients are neither known nor stored by the home or host server. The processes associated with delivering the content to the e-mail and ultimately, redirecting the browser of the user to a target web site, once a link in the e-mail has been activated, are, for example, performed in real time, while a connection or pipe is open between the e-mail client and the home or host server.

The systems, methods, hardware and software associated with creating, delivering and providing content to the e-mails, and directing the browser of the user to the targeted web site associated with the requisite e-mails, as detailed below, is disclosed in commonly owned U.S. patent application Ser. No. 10/915,975, entitled: Method And System For Dynamically Generating Electronic Communications (U.S. Patent Application Publication Ser. No. 2005/0038861 A1), this patent application and Patent Application Publication, are incorporated by reference herein. U.S. patent application Ser. No. 10/915,975, entitled: Method And System For Dynamically Generating Electronic Communications and U.S. Patent Application Publication No. 2005/0038861 A1, are used interchangeably herein.

Throughout this document, textual and graphical references are made to actual and fictional trademarks and Internet addresses (Uniform Resource Locators, also known as URLs). Also, throughout this document, numerous textual and graphical references are made to actual and fictional trademarks. These trademarks and Internet addresses are for explanation purposes only, and any association with any party or other entity is coincidental, unintentional and unrelated thereto. All trademarks and Internet Addresses are the property of their respective owners, and are referenced only for explanation purposes herein.

Figure 1:
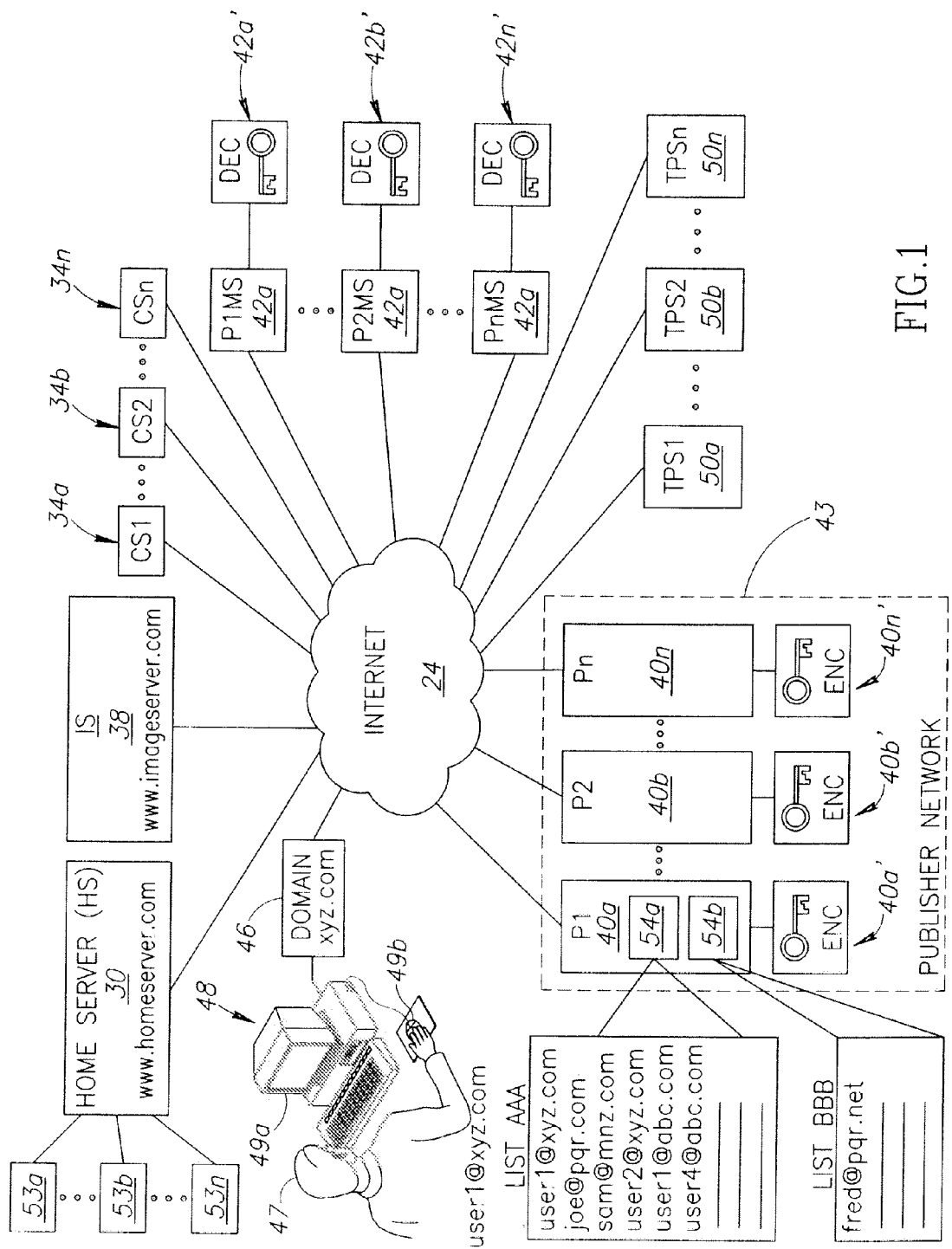
FIG. 1 is a diagram of an exemplary system on which an embodiment of the invention is performed.

FIG. 1 shows the present invention in an exemplary operation. The present invention employs a system 20, formed of various servers and server components, that are linked to a network, such as a wide area network (WAN), that may be, for example, the Internet 24.

There are, for example, at least three kinds of servers that form the system 20. These servers typically include a Home Server (HS) 30, one or more content servers (CS) 34a-34n (by "n" it is meant member, element, component, etc., the last in a series, sequence, or the like, here, for example, of content servers (CS), but this definition of "n" and "nth" is applicable throughout this document), and an imaging server (IS) 38. There are also publisher servers (P1-Pn) 40a-40n, associated with encryption applications or encryption keys (ENC) 40a'-40n' and messaging servers (P1MS-PnMS) 42a-42n, corresponding to each publisher (P), typically of a publisher network (shown by the broken line box 43). Each messaging server (P1MS-PnMS) 42a-42n is associated with a decryption application or decryption key (DEC) 42a'-42n'.

These servers 30, 34a-34n, 38, 40a-40n, and 42a-42n, are linked to the Internet 24, so as to be in communication with each other. The servers 30, 34a-34n, 38, 40a-40n, and 42a-42n, include multiple components for performing the requisite functions as detailed below, and the components may be based in hardware, software, or combinations thereof. The servers 30, 34a-34n, 38, 40a-40n, and 42a-42n, may also have internal storage media and/or be associated with external storage media.

The servers 30, 34a-34n, 38, 40a-40n, and 42a-42n of the system 20 are linked (either directly or indirectly) to an endless number of other servers and the like, via the Internet 24. Other servers, exemplary for describing the operation of the system 20, include a domain server 46 for the domain (for example, the domain "xyz.com") of the user 47 (for example, whose e-mail address is user1@xyz.com), linked to the computer 48 of the user. The computer 48 typically includes a monitor 49a, on which images are viewed, and a pointing and activating device or mouse 49b. Still other servers may include third party servers (TPS) 50a-50n, controlled by content providers and the like. These third party servers (TPS) 50a-50n, typically host targeted web sites (composed of web pages and other similar files), and may also be associated with the publishers of the publisher network 43.

While various servers have been listed, this is exemplary only, as the present invention can be performed on an endless numbers of servers and associated components, that are in some way linked to a network, such as the Internet 24. Additionally, all of the aforementioned servers include components for accommodating various server functions, in hardware, software, or combinations thereof, and typically include storage media, either therein or associated therewith. Also in this document, the aforementioned servers, storage media, components can be linked to each other or to a network, such as the Internet 24, either directly or indirectly.

The home server (HS) 30 is of an architecture that includes components, modules and the like, for handling electronic mail, to perform an electronic mail (e-mail) server functionality, including e-mail applications. The architecture also includes components, modules and the like, for providing numerous additional server functions and operations, for example, comparison and matching functions, policy and/or rules processing, various search and other operational engines. The Home Server (HS) 30 includes various processors, including microprocessors, for performing the aforementioned server functions and operations and storage media, either internal or associated therewith, such as caches 53a-53n. While these caches 53a-53n are shown, this is for explanation purposes, as the Home Server (HS) 30 may be associated with additional caches, databases, as well as numerous other additional storage media, both internal and external thereto.

The home server (HS) 30 receives requests from e-mail clients, for example, America Online® (AOL®), Outlook®, Eudora®, Hotmail®, MSN®, Yahoo® Mail®, or other web-based clients, and composes and sends e-mails to intended recipients over the network. In this document, the client is an application that runs on a computer, workstation or the like, and relies on a server to perform some operations, such as sending and receiving e-mail. Also, for explanation purposes, the Home Server (HS) 30 may have a uniform resource locator (URL) of, for example, www.homeserver.com.

For example, the intended recipient or user 47 has a computer 48 (such as a multimedia personal computer with a Pentium® Central Processing Unit (CPU), that employs a Windows® operating system), that uses an e-mail client. The computer 48 may also be referred to as a machine, and may also be a work-station or other computer-type device. The computer 48 is linked to the Internet 24, for example, typically through its domain server 46. This Home Server (HS) 30 typically employs a search engine, or links to one (in another server or the like via the Internet 24), in order to direct the received request to the most suitable content server (CS) 34a-34n. While a single Home Server (HS) 30 is shown, the Home Server (HS) 30 may be formed of multiple servers and/or components, and may also be formed from still other servers with e-mail functionalities.

Content Servers (CS) 34a-34n (one or more) are also linked to the Internet 24. The content servers (CS) 34a-34n provide content, typically in text form, for the imaging server (IS) 38, typically through the Home Server (HS) 30, and typically, in response to a request from the Home Server (HS) 30, as detailed below. These content servers (CS) 34a-34n may be, for example, Pay-Per-Click (PPC) servers of various content providers, such as internal providers, or external providers, for example, Overture Services, Inc. or Findwhat, Inc.

At least one imaging server (IS) 38 is linked to the Internet 24. The imaging server (IS) 38 functions to convert text (data in text format) from the content servers (CS) 34a-34n, as received through the Home Server (HS) 30, to an image (data in an image format). After conversion into an image, the image is typically sent back to the Home Server (HS) 30, to be placed into an e-mail opened by user the 47 (recipient or intended recipient), as detailed below. Alternately, the imaging server (IS) 38 may send the image directly to the e-mail client associated with the user 47, over the Internet 24. For exemplary purposes, the imaging server may have a URL of www.imageserver.com.

The publisher servers (P1-Pn) 40a-40n, typically include databases, that typically include lists 54a, 54b. The lists, for example, list AAA 54a and List BBB 54b, typically include e-mail addresses of users, potential recipients of the various informational or advertising campaigns being administered by the home server (HS) 30. The encryption application 40a'-40n' associated with each publisher server 40a-40n, may be a single or double encryption application. For example, a suitable one-way encryption application is MD5 Hash, http://www.ietf.org/rfc/rfc1321.txt, and described in, R. Rivest, The MD5 Message-Digest Algorithm, Network Working Group, Request for Comments: 1321, April 1992 (RFC 1321), this document incorporated by reference herein. For example, a suitable two way encryption application is Blowfish, as listed at http://www.schneier.com/blowfish.html, and, for example, as described in, "Blowfish (cipher), from Wikipedia, The Free Encyclopedia, 2006 (4 pages), this document incorporated by reference herein. Each publisher server (P1-Pn) 40a-40n includes a corresponding publisher messaging server (P1MS to PnMS) 42a-42n. Each publisher messaging server P1MS-PnMS 42a-42n, has an associated decryption application or key (DEC) 42a'-42n'. The decryption keys 42a'-42n' are typically specific to and correspond to the encryption applications or keys (ENC) 40a'-40n' for each publisher sever combination, for example, P1 40a to P1MS 42a, through to Pn 40n to PnMS 42n.

Figure 2A:
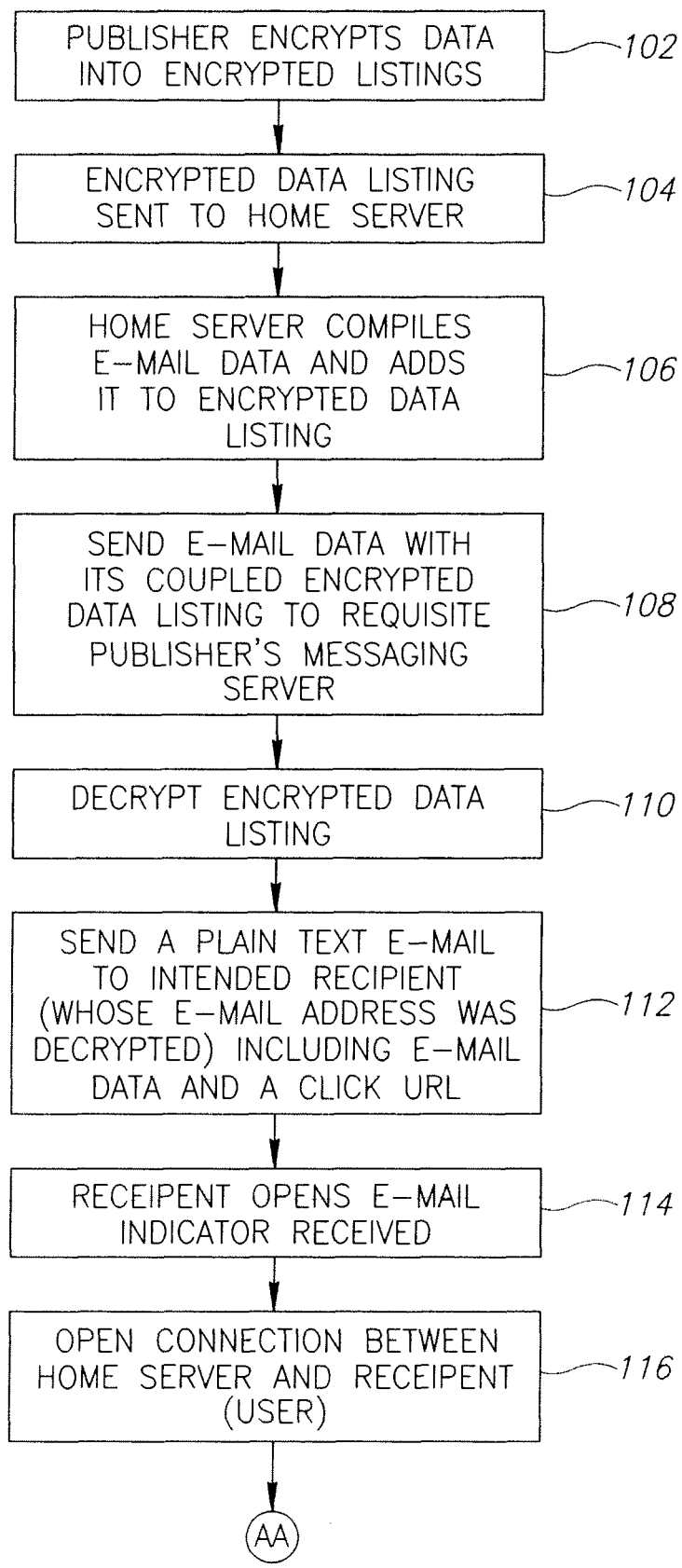
FIGS. 2A and 2B are a flow diagram of a process for generating the content for an e-mail in accordance with an embodiment of the invention.
Figure 2B:
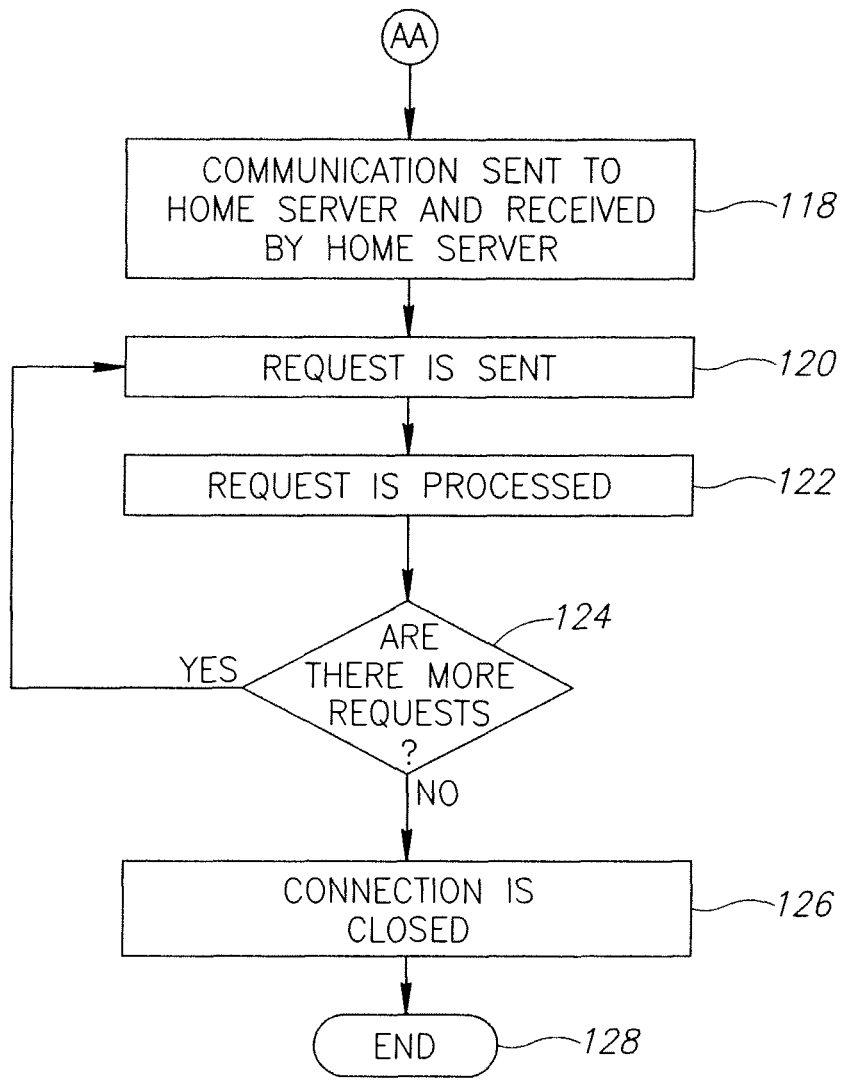
Figure 3A:
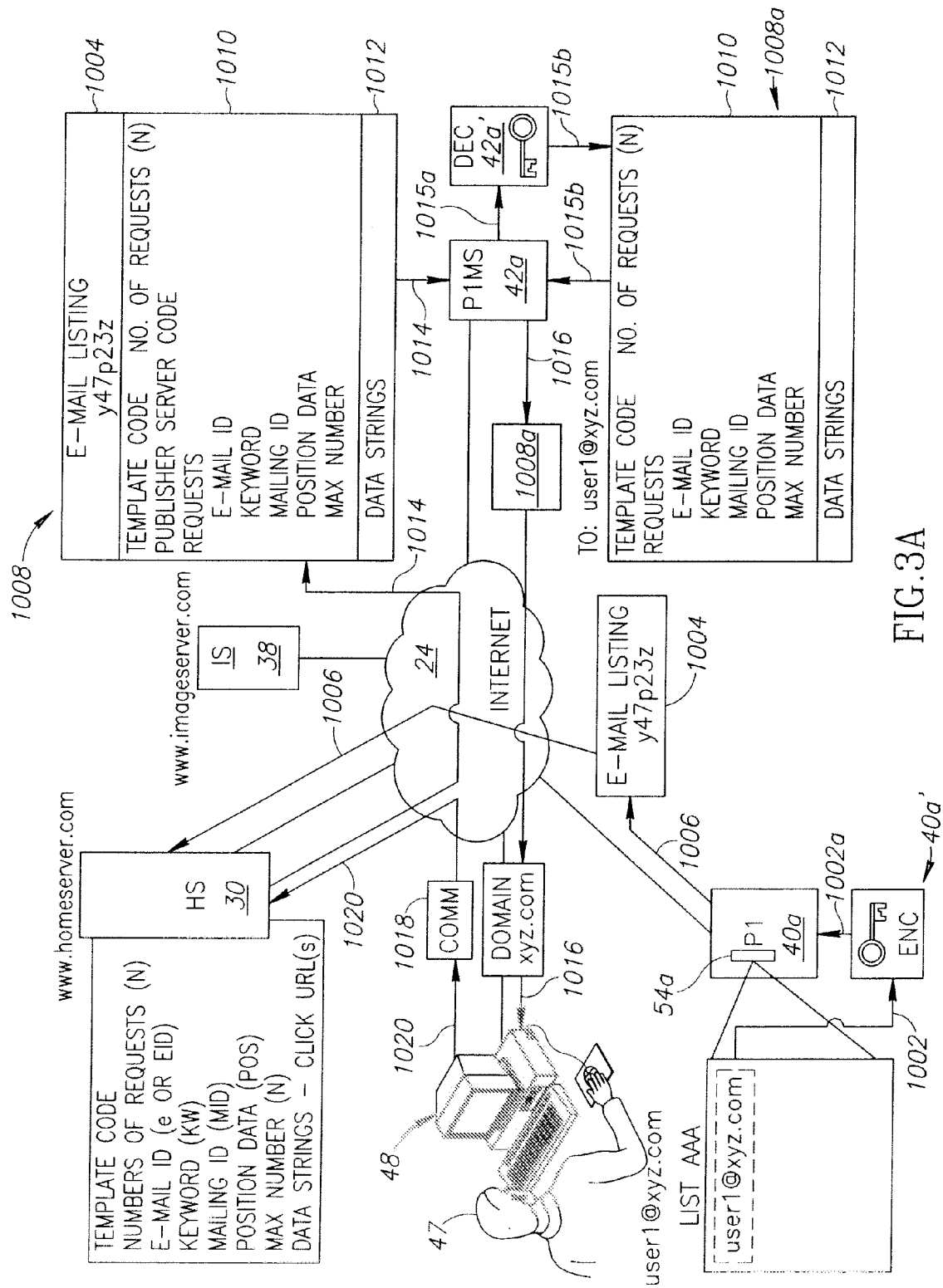
FIG. 3A is a diagram detailing flow of an e-mail from its creation through its being opened by the intended user.
Figure 3B:
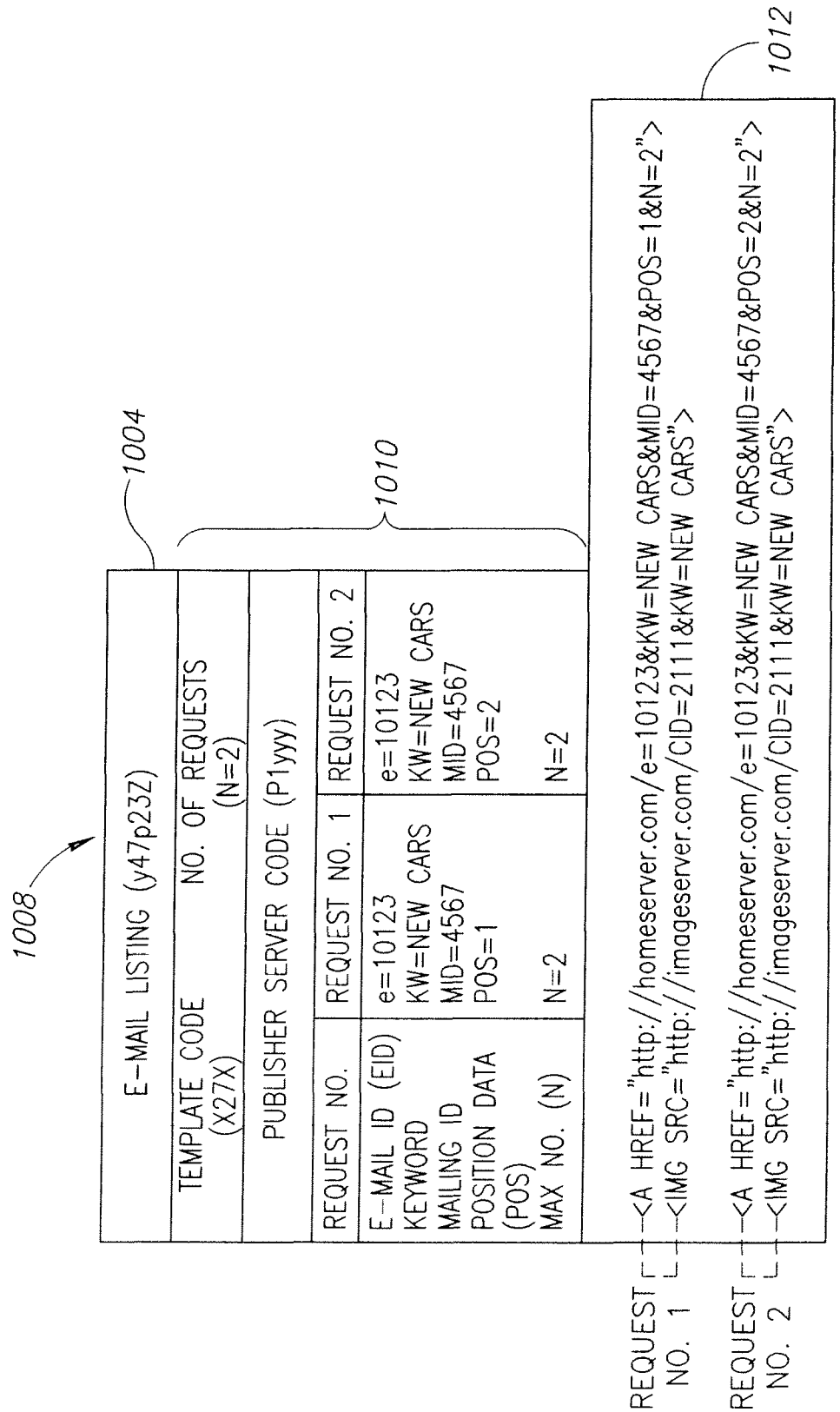
FIG. 3B is a schematic diagram of an e-mail created in accordance with an embodiment of the invention.
Figure 3C:
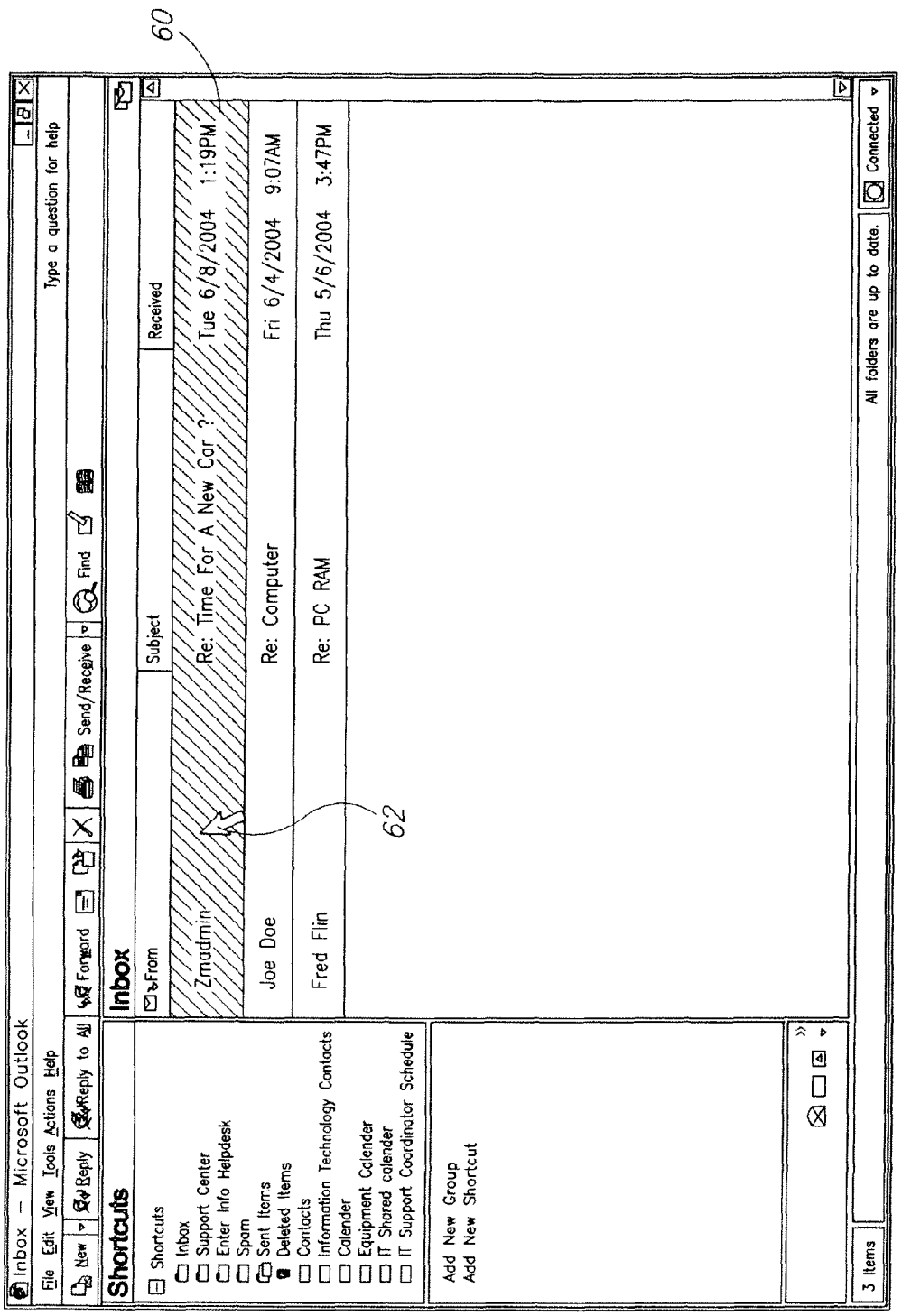
FIG. 3C is a screen shot showing e-mail communications in the mailbox of a recipient.

Turning also to FIGS. 2A and 2B, collectively referred to hereinafter as FIG. 2, an exemplary implementation of a process in accordance with an embodiment of the present invention will now be described. FIG. 2 is a flow diagram of the process (method). Various aspects of the process of FIG. 2 are illustrated in FIGS. 3A-3C, to which reference is also made.

The process of FIG. 2 may be the first phase of a larger process. For example, the first phase may involve rendering an e-mail to an e-mail client, while the second phase, shown in FIG. 10 and detailed below, is dependent on the first phase. The second phase directs the user to a target web site, via a link, that is activated once the user has clicked his mouse 49b on the dynamically rendered image or a portion thereof, of the opened e-mail, that is paired with the link.

The computer 48 associated with the user 47 includes an e-mail client (detailed above), installed thereon, that provides the user with a unique access and the ability to utilize one or more e-mail addresses. For example, the user 47 has an e-mail address, user1@xyz.com, through which he receives his e-mail from the domain server 46, that hosts the domain xyz.com, of which the user 47 is a member. The computer 48 also includes a web browser, browsing software, application, or the like, to access web sites or web pages from various servers and the like, on the Internet 24. Some exemplary web browsers/web browsing software include, Internet Explorer®, from Microsoft, Redmond, Wash., and Netscape® Navigator®.

Initially, and also making reference to FIG. 1, at block 102, a publisher server, for example, server 40a, associated with a first publisher (P1), is signaled to begin an informational or advertising campaign. The publisher server 40a (for example the server of a first publisher P1) includes a database, that includes lists of e-mail addresses of users (recipients). For example, the list (List AAA) 54a includes the e-mail address of the example user or recipient, user1@xyz.com. Each e-mail address is in the form of data, that is encrypted, by the encryption application 40a' into encrypted listings 1004 (by any of the encryption applications detailed above). This is shown by arrow 1002 (e-mail address, user1@xyz.com, from the List AAA 54a is encrypted) and arrow 1002a (the encrypted e-mail address is sent or positioned in the publisher server P1 for sending), of FIG. 3A. The encrypted listings 1004 are then sent to and received by the home server (HS) 30, at block 104, as shown by the arrow 1006 (FIG. 3A).

The home server (HS) 30 compiles data, corresponding to each encrypted listing received, at block 106. The data compiled is for conversion to e-mail 1008 (FIG. 3B) and images in the e-mail. In compiling the data, for each encrypted listing 1004, e-mail data 1010 is added to each encrypted listing 1002 for items including, a template code (i.e., X27X), the number of requests (one or more), an identifier for the publisher messaging server for decryption (i.e., P1yyy), and the actual requests. The requests typically include, an e-mail identifier (e-mail ID, e, or EID), one or more keywords (KW), a mailing identifier (mailing ID or MID), position data (POS), corresponding to the number of dynamically generated links to be rendered to the template, once it has been built out, a max number (N) representing the number of requests and corresponding positions to be filled with links to targeted web site in the template and e-mail body. There is also a data strings area 1012 for data strings, corresponding to each request of the number of requests. The encrypted listing 1004, e-mail data 1010, and data strings area 1012, form this initial e-mail 1008.

The data strings themselves are shown in the e-mail 1008 of FIG. 3B. The data strings are typically paired strings, each pair of the paired strings corresponds to a request, of the total number of requests for the specific e-mail. One string of the paired strings is a click URL, as indicated by the language "A HREF". This first string becomes an activatable link in the body of the e-mail, once the content is placed into the e-mail. The second string of the paired strings "IMG SRC", designating a source for the image to be rendered to the template (the body of the e-mail), for the requisite position in the template or e-mail body and click URL.

For example, the first string in the first pair, corresponding to the first request is: <"A HREF=http://homeserver.com/e=10123&KW=NEW CARS&MID=4567&POS=1&N=2">

In this first string, there is URL to direct the browser of the user who has activated or clicked on the link with the click URL to the home server (HS) 30, "e" is the e-mail ID (EID) (i.e., 10123), "KW" is the keyword or keywords (i.e., NEW CARS), "MID" is the mailing ID, for example, the batch which the e-mail is from (i.e., 4567), POS is the position date, the position in the template and ultimately the body of the e-mail where the click URL will be located, to serve as the underlying link, detailed below, and N is the max number, for example, "2", as there are two requests corresponding to two positions for links, i.e., click URLs.

The second string of the first pair is for obtaining the image associated with the position in the template and ultimately the body of the e-mail. This string is expressed as: <"IMG SRC=http://imageserver.com/CID=2111&KW=NEW CARS">

In this second string, there is a URL for the imaging server (IS) 38 (i.e., www.imageserver.com), to enable the requisite image for the requisite campaign, illustrated by CID or campaign identifier (i.e., 2111), to be pulled and imported into the template. "KW" is the keyword or keywords, used to assist in pulling the requisite image.

As there is a second request, there is a second pair of strings, for example, <"A HREF=http://homeserver.com/e=10123&KW=NEW CARS&MID=4567&POS=2&N=2"><"IMG SRC=http://imageserver.com/CID=2111&KW=NEW CARS">

This second pair of strings for the second request is typically identical to the first pair of strings, except that in the first string of the pair, the position data (POS) is "2", to represent the second position in the template, where this click URL will be located.

At block 108, the home server (HS) 30 sends or pushes the e-mail 1008 (formed of the encrypted listing 1004, e-mail data 1010, and data strings, in the data strings area 1012) to the requisite publisher's messaging server 42a-42n (arrow 1014) (P1MS to PnMS). The requisite publisher's messaging server is located from the code for the publisher's messaging server, added to the encrypted e-mail listing, at block 106, as detailed above. For example, as the server 40a of publisher P1 sent the encrypted e-mail address, the home server (HS) 30 assigned the encrypted data and the e-mail data with a code (for example, P1yyy) for Publisher P1's messaging server P1MS 42a. Accordingly, the encrypted e-mail listing and e-mail data are sent to Publisher P1's messaging server 42a (P1MS).

By applying a decryption key, at the requisite publisher's messaging server, for example, key 42a' for publisher P1's messaging server 42a, the encrypted e-mail listing is decrypted, at block 110, as per the arrow 115a. The decrypting includes decrypting the encrypted e-mail listing to an e-mail address in plain text (for example, the encrypted code y47p23z is decrypted back to user1@xyz.com).

The process moves to block 112. Here, the now modified e-mail 1008a (having e-mail data 1010 and data strings area 1012), with the encryption code (i.e., y47p23z) removed and the Publisher Server Code (i.e., P1yyy) either removed or deactivated, is sent or positioned in the publisher messaging server P1MS 42a for sending, as per the arrow 1015b. The publisher messaging server P1MS 42a sends the modified e-mail 1008 onward, to the e-mail client of the intended recipient (user1@xyz.com), as per the arrow 1016. This modified e-mail 1008a, for explanation purposes, is now also referred to as the "sent e-mail," as it is being sent to the e-mail client associated with the computer 48 of the intended recipient or user 47.

The sent e-mail may be, for example, in Hypertext Markup Language (HTML), and may include one or more Hypertext Transport Protocol (HTTP) source requests. These HTTP source requests typically reference the Home Server (HS) 30.

The sent e-mail includes a program that provides the body of the e-mail when the e-mail is opened. The program provides a template (FIG. 4), that forms the basic structure or framework for the image(s) of the sent and opened e-mail, and, zero or more HTTP Source requests for zero or more static images. The sent e-mail may also include HTML constructs and text, such as plain text, HTML headers, list constructs and the like. The sent e-mail, as received by the e-mail client, typically appears on the screen (monitor) 49a of the user's computer 48 as a line of text 60 (shown as shaded for emphasis only) identifying the sender, subject and other information, as shown in FIG. 3C.

The sent e-mail typically includes one or more requests. The total number of request(s) is represented by "N". A single request typically corresponds to a single image to be rendered (into the template of the e-mail image) when the e-mail is opened by the user 47 (as detailed below).

Each of the one or more requests in the e-mail may include data (or data elements) such as: a) an e-mail identifier (EID); b) at least one keyword, or data corresponding to at least one keyword; c) mailing identifier (MID); d) position data; and, e) a max number, corresponding to the maximum number of images (represented in this document by "N") that will be dynamically generated and rendered for this particular e-mail.

Each of the one or more requests in a sent e-mail typically includes all five of these data elements. However, if there is only a single request in a sent e-mail, position data is typically not included, because there is only one position for the dynamically generated text in the request (and the max number is 1, N=1).

The e-mail identifier (EID), may be, for example, a code of numbers, letters, symbols, or combinations thereof, for the recipient of the sent e-mail, or any other data that guarantees uniqueness for the particular sent e-mail (and its corresponding returned request(s)). An e-mail identifier is attached to each encrypted listing and the subsequently "sent e-mail". The keyword is a word or group of words, such as a phrase, or other suitable identifier for one or more data object(s).

The mailing identifier (MID) is a sequence of characters indicative of the batch (or informational or advertising campaign) from which the particular e-mail was sent. For example, a mailing identifier may be a sequence of numbers, letters, symbols, or combinations thereof.

The position data is data indicative of the location in the template where the image corresponding to that particular request is to be rendered (placed or located). The max number is typically equal to N, as each request typically results in a single image being dynamically generated.

Figure 4:
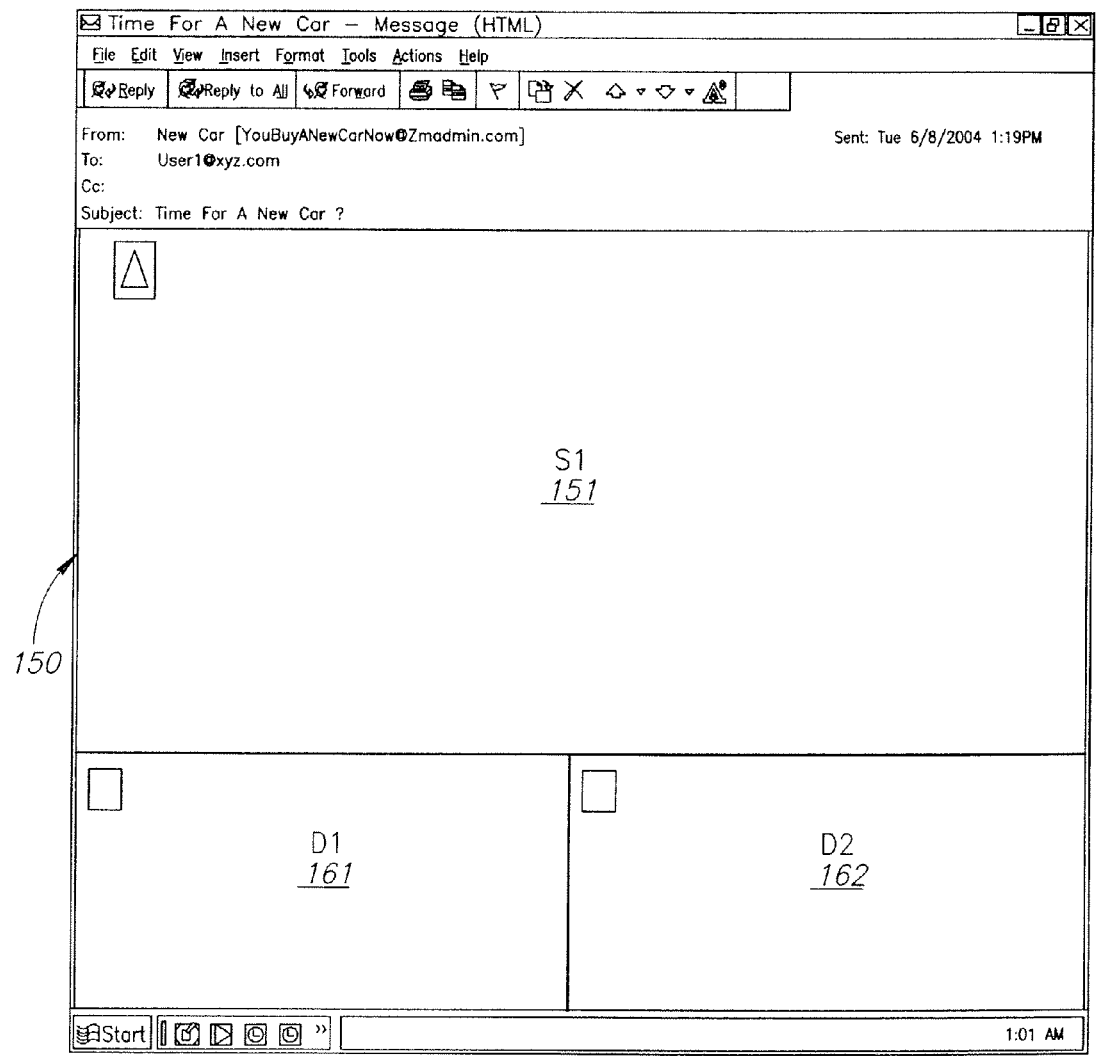
FIG. 4 is a screen shot of an exemplary template in accordance with an embodiment of the invention.

When e-mail (the sent e-mail) is downloaded by the e-mail client of the user 47, and it is opened or activated (typically by a mouse click 62 on the text line 60, of FIG. 3C), the e-mail client opens a connection or "pipe" to the Home Server (HS) 30. The e-mail client associated with the user 47 pulls data from the Home Server (HS) 30, and may pull data asynchronously. The data pulled from the Home Server (HS) 30 includes data required to display the resultant dynamically generated text (in the form of images), for example, a template 150, as shown in FIG. 4, and the single or multiple requests.

At block 114, the recipient (user 47) opens this e-mail, typically by clicking the mouse 49b (of the computer 48), as shown by the arrow 62, anywhere along the line 60, that represents the sent e-mail, as received in the user's mail box, as shown in FIG. 3C. An indicator for the opening is received at the home server (HS) 30. This indicator may be, for example, a web bug. The web bug is part of the e-mail data 1010 assembled in the home server (HS) 30 and is coded to route to the home server (HS) 30 upon opening of the e-mail, to open the connection or pipe. As used in this document, a web bug is a lag request, that is placed into an e-mail to monitor user behavior, for example, the opening of the requisite e-mail. This opening, for purposes of explanation herein, occurs at a time indicated as $t_1$.

A connection or "pipe" is now opened (when the e-mail is opened, for example, by the "click" of arrow 62), typically by the home server (HS) 30, between the home server (HS) 30 and the computer 48 of the user 47 (including the e-mail client), at block 116. This connection enables pulling of data from the Home Server (HS) 30 by the e-mail client associated with the computer 48 of the user 47. The data pulling is typically continuous, and typically in real time, as long as requests are being processed, as described below.

The e-mail data 1010 and the data strings (in the data string area 1012), form a communication (COMM) 1018, that is sent to the home server (HS) 30 at block 118 (as per the arrow 1020). From e-mail data 1010 of the communication 1018, the template, corresponding to the requisite template code of the communication 1018, is pulled from a database in or associated with the home server (HS) 30. The requisite template is sent through the connection or "pipe" to the user's e-mail client and computer 48, where it is built out.

Turning to FIG. 4, an exemplary template 150, that forms part of the body of the opened e-mail, is built out in three sections 151, 161 and 162. A first section S1 151 is designed to receive a static image, having content that is fixed prior to the time the e-mail was sent. The image for the section S1 151 is typically pulled from the Home Server (HS) 30 along with the template 150, when the e-mail is opened, as detailed above.

Sections D1 161 and D2 162, for example, are designed to receive the dynamically generated images, that are generated and assembled when and only if the e-mail is opened. Section D1 161, for example, is the first position for the dynamically generated images, and as such, receives the image from the first listing of the listing text (described below), resulting from the first request being processed; this first request, for example, has position data (POS=1) corresponding to this first position. Similarly, Section D2 162, for example, is the second position for the dynamically generated images, and as such, receives the image from the second listing of the listing text (described below), resulting from the second request being processed; this second request, for example, has position data (POS=2) corresponding to this second position.

With the connection (pipe) now open, the e-mail client sends one or more requests from the sent e-mail (that has now been opened), to the Home Server (HS) 30, at block 120. Each of these one or more requests sent from the e-mail client to the Home Server (HS) 30 is referred to as a "sent back" request. Each "sent back" request includes portions of, and typically all of the data (or data elements) from the corresponding requests in the sent e-mail. For example, each sent back request is typically formed of data (data elements) including: a) an e-mail identifier (EID); b) at least one keyword, or other suitable identifier for at least one data object typically within a server, such as one of the content servers (CS) 34a-34n; c) a mailing identifier; d) position data; and, e) a max number.

The Home Server (HS) 30 processes each request, one at a time, at block 122. The processing of all of the requests, is typically performed in real time, for example, when the connection or pipe between the e-mail client of the requisite user and the home server (HS) 30 is open.

This sub process of processing the request is described in detail below, with respect to FIG. 5. The result of each processed request includes obtaining text from a content server (CS) 34a-34n or cache (or other similar storage medium) 53a-53n, that may be associated with the Home Server (HS) 30, and returning it to the Home Server (HS) 30. The Home Server (HS) 30 sends this data (e.g., binary data in text form) to the imaging server (IS) 38, that generates an image(s) corresponding to the received data (text data). This generated image is returned to the e-mail client of the user, through the Home Server (HS) 30. The aforementioned data transfers may occur over previously opened and/or existing connections or pipes in the Internet 24 (network).

In the case of an HTTP request, the generated image is sent back to the e-mail client associated with the user 47, through the open connection or pipe. Alternately, for non-HTTP requests, the Home Server (HS) 30 could generate one or more new open connections or pipes, that are different than the previously existing connections or pipes over which the request was sent to the Home Server (HS) 30. It is over these new connection(s) or pipe(s) that the image, from the imaging server (IS) 38 may be transferred from the Home Server (HS) 30 to the e-mail client associated with the user 47, over the Internet 24.

The process moves to block 124, where it is then determined, typically in the Home Server (HS) 30, if there are more requests to be processed. If there are not any more requests to be processed, the connection or "pipe" is closed between the computer of the user, for example computer 48, and the home server (HS) 30, at block 126. The process ends at block 128.

If there are more requests to be processed, the process returns to block 120. The next request of the total number or "N" requests is sent, and the process continues from block 120, as described above. The process will repeat until all N requests have been processed, and once all N requests have been processed, the process ends at block 128.

Figure 5:
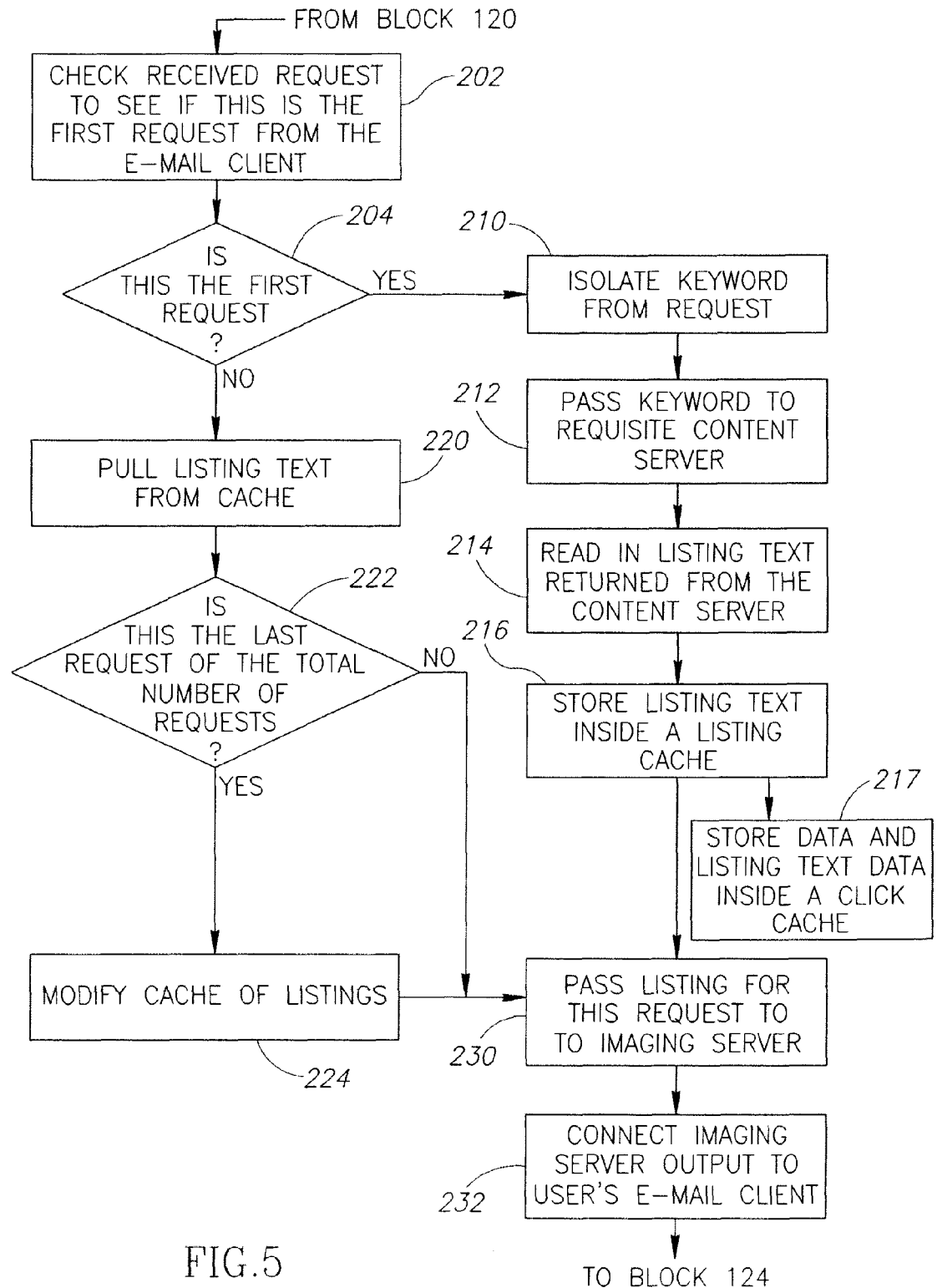
FIG. 5 is a flow diagram of the request processing sub process of FIG. 2.

Attention is now directed to FIG. 5, that shows a flow diagram of block 122 of FIG. 2, detailing the processing of requests. In this process, requests are processed one at a time, on a "first in" basis.

Initially, the Home Server (HS) 30, upon receiving the request, at block 202, checks the received request to determine if it is the first request from the e-mail client of the user 47.

At block 204, a determination if the request is the first request is made. This determination includes extracting the e-mail identifier (EID) from the request (the "sent back" request) that the e-mail client has returned to the Home Server (HS) 30. The e-mail identifier, plus the keyword, or a variant of it, and the mailing identifier are grouped (combined) to define a key at the Home Server (HS) 30, in accordance with the policy or rules of the Home Server (HS) 30. The key is queried against all other keys in a cache, for example, the cache 53a, known as a key cache, shown in FIG. 6, associated with the Home Server (HS) 30, for a match. Matching keys may be of identical or similar keys, in accordance with predetermined rules and/or policies programmed into the component(s) of the Home Server (HS) 30.

If a matching key is not found in the key cache 53a, this is the first request, and the process moves to block 210. The key cache 53a is empty of this particular key. Accordingly, the e-mail identifier plus the keyword and the mailing identifier becomes a key and is stored in the cache 53a, as shown, for example, in FIG. 6. All of the requests from a particular e-mail ("sent e-mail") have the same key. Alternately, if a matching key is found, the process moves to block 220.

As shown in FIG. 6, keys, indicated by KEY 1 to KEY 4 are unique to each opened e-mail for each particular recipient (user), as identified by the corresponding e-mail identifier (i.e., 10123, 10791, 12828, 17401) in accordance with the time each e-mail was opened. For, example, the same user may open two different e-mails, but will have an e-mail identifier (ID) of 10123 and 12828 for each respective opened e-mails. This user, based on the e-mail identifiers, will receive the content corresponding to each specific e-mail, based on the keywords (i.e., NEW CARS and MORTGAGE, respectively). Similarly, in FIG. 6, the user having the e-mail identifier 10791 may receive different content than the user with the e-mail ID 10123, even though their requests were based on the same keyword "NEW CARS", and they received their e-mail in the same batch, as indicated by the same mailing identifier.

Also, the number of requests "N" is stored in a request cache, along with a key. A request cache may be, for example, the cache 53b.

Turning to block 210, the request being processed is the first request. The keyword in the request is isolated. The keyword is typically in the form of alphanumeric data, and may be an actual keyword, or a keyword group identifier. The keyword is translated into data, recognizable and usable by the requisite content servers (CS) 34a-34n.

The process now moves to block 212, where the keyword (data corresponding to the keyword) is read, and in accordance with the reading, it is passed to a designated content server (CS) 34a-34n, over the Internet 24. The passing to the specific content server is typically in accordance with one or more rules, preprogrammed into the Home Server (HS) 30 or by a policy processor associated with the Home Server (HS) 30. The policies and/or rules are typically time-sensitive, to be applicable in real-time. For example, the keyword may be such, that once read, the preprogrammed rules will be applied. The keyword data will be passed to a specific content server, such as content server (CS) 34a, over Internet 24.

The content servers (CS) 34a-34n may include prearranged listings. Alternately, for example, one or more of the content servers (CS) 34a-34n may be for Pay Per Click (PPC) advertising content. In PPC advertising, the content server creates a listing text, with listings being prioritized, based on the amount an advertiser will pay for a user who clicks their mouse on the advertiser's link in order to direct the user's browser to the advertiser's designated (targeted) web site (or web page).

Alternately, the keyword can be passed to a content server (CS) 34a-34n that performs a search engine function and generates a listing text, typically of N listings. N corresponds to the number of requests in the sent e-mail.

The content server (CS) 34a-34n, for example, content server (CS) 34a, that received the passed keyword (keyword data), is queried for acceptance of the keyword (keyword data), and returns a listing text to the Home Server (HS) 30. This listing text is read into the Home Server (HS) 30, at block 214. Data exchanges, between the Home Server (HS) 30 and the content server (CS) 34a (representative of all content servers (CS) 34a-34n), are typically accomplished via Extensible Markup Language (XML).

The listing text, that is returned to the Home Server (HS) 30 from the content server (CS) 34a, is assigned a particular key, corresponding to the new key created in the key cache 53a (as a result of a matching key not being found), and includes the top "N" results, in the form of N listings. N is the total number of requests in the originally sent e-mail, as detailed above. Each listing of the listing text typically includes a title or headline for the content (e.g., the advertisement) to be returned to the e-mail client of the user 47, in accordance with the corresponding e-mail ID, at least one target uniform resource locator (URL) for one or more servers, such as third party servers (TPS) 50a-50n, and data for the body of the content to be returned. The data for the body of the content to be returned includes data in text form and position data, indicating the location for the data in text form in the template. The aforementioned portions of the listing text can be parsed, in accordance with the process being performed thereon.

The listing text is then stored in a cache, for example, the listing cache 53c, at block 216. The key assigned to the listing text, upon its being stored in the listing cache 53c, is linked to its corresponding key, typically in another cache, such as the key cache 53a.

Figure 7:
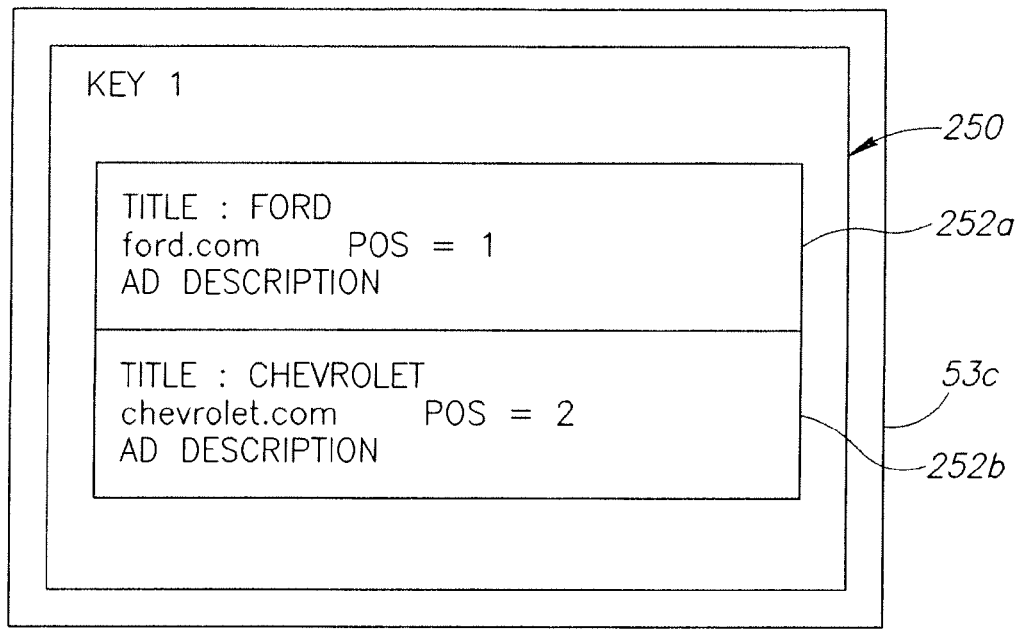
FIG. 7 is a diagram of a listing cache in accordance with an embodiment of the invention.

FIG. 7 shows an exemplary listing cache 53c, where a listing text 250 is stored therein. The listing text 250 includes a key, for example, KEY 1, formed of the e-mail identifier (EID), for example, 10123, the keyword, for example, NEW CARS, and, the mailing identifier (MID), for example, 4567, as shown in FIG. 6 and detailed above, and two (N=2) listings 252a-252b. Within each listing 252a-252b is, for example, a title for a web site associated with the listing (for example, in listing 252a, the title is FORD), a URL for the web site associated with the listing (for example, in listing 252a, the URL is www.ford.com), position data indicating the location in the template where the image with the link to the web site associated with the listing (for example, in listing 252a, the position data is, POS=1), and data for the body of the content to be returned is referenced as "AD DESCRIPTION". The AD DESCRIPTION is the text to be sent to the imaging server (IS) 38 with the TITLE, to be converted into the requisite image, for placement into the template of the opened e-mail at the requisite position. The listings 252a and 252b are typically placed into the listing text in an order of priority, here, for example, top to bottom or 252a, followed by 252b. Additionally, by storing the listing text in the cache 53c with a unique key, a specific user will receive listings intended for him at the time he opened the e-mail.

Accordingly, processing of the first request will result in the delivery of the first listing 252a in the form of an image, to the template of the opened e-mail at a position determined by the position data in the first request (for example, at a first position as the position data is POS=1). Similarly, processing of the second request will result in the delivery of the second listing 252b in the form of an image, to the template of the opened e-mail at a position determined by the position data in the second request (for example, at a second position as the position data is POS=2). Processing of the requests until the last or Nth request, here, for example, the Nth request is the second request, where N=2, results in delivery of the nth listing 252n (i.e., 252b) to the Nth position in the template (i.e., the second position) of the opened e-mail, in accordance with the position data, POS=N (i.e., POS=2) (as detailed below).

Figure 8:
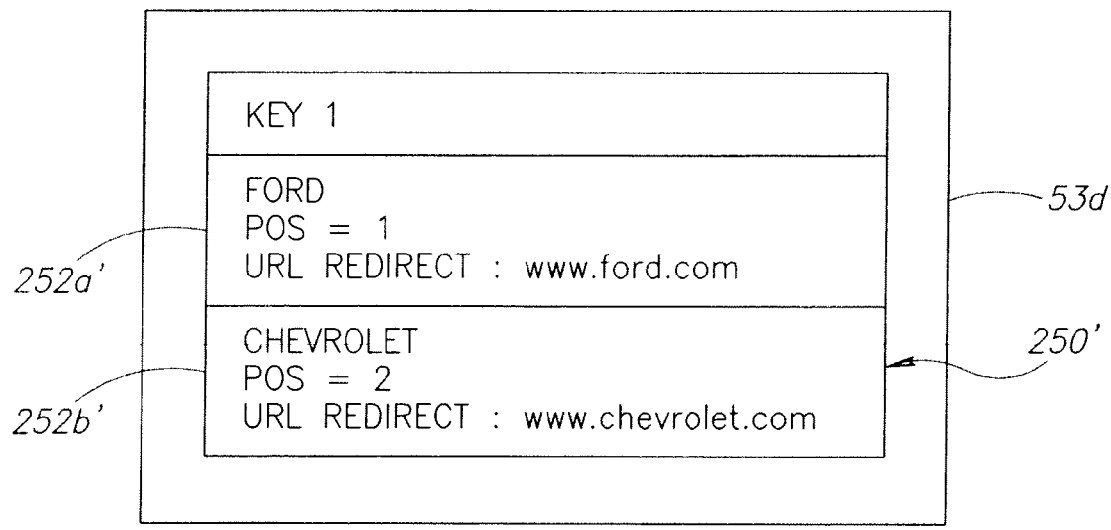
FIG. 8 is a diagram of a click cache in accordance with an embodiment of the invention.

Portions of the listing text are also stored in another cache, for example, a click cache 53d, at block 217. FIG. 8 shows an exemplary click cache 53d, where a listing text 250', corresponding to the listing text 250 of the listing cache 53c, is stored in the click cache 53d. The listing text 250' includes a key, identical to the corresponding key in the key cache 53a, as well as listings 252a'-252b'. Each listing 252a'-252b' corresponds to the listings 252a-252b of the listing text 250. Within each listing 252a'-252b' is, for example, a title for a web site associated with the listing (for example, FORD in the listing 252a'), a Redirect URL for the target web site associated with the listing (for example, www.ford.com, in the listing 252a'), and Position Data indicating the location for the resultant image produced from the listing in the template. For example, position data in the listing 252a' is represented as POS=1. Similarly, position data in the listing 252b' is represented as POS=2 (for example, with the redirect URL for the target web site www.chevrolet.com).

From block 216, the process moves to block 230, where the listing corresponding to the request number, and accordingly, the position data, is passed from the listing cache 53c of the Home Server (HS) 30 to the imaging server (IS) 38, over the Internet 24.

The imaging server (IS) 38 receives the listing in a text format and converts it into an image (or images). The image (or images) are sent to the e-mail client, corresponding to the requisite e-mail identifier (EID), via the Home Server (HS) 30, at block 232. The image(s) for the listing are rendered to the template in the position corresponding to the position data for the listing. The rendered image is typically paired with one or more links within the template, and, for example, at least one link within each image. The links are planted in the template in such a way that makes the image, or a portion thereof, clickable (activatable by a mouse click). The link overlies the click URL for the requisite request number and its corresponding position in the body of the e-mail, as the link was placed into the template. Accordingly, the link includes the underlying click URL for the Home Server (HS) 30 in a string, for example, that was created by the home server (HS) 30 or components associated therewith, prior to the decryption process, at block 106 (FIG. 2) above. The string, for example, includes, an e-mail identifier (EID), keyword (KW), mailing identifier (MID) and position data (POS). The string typically also includes, for example, the max number (N). These components for the string are detailed above. Accordingly, an example string may be as follows: <"http://home-server.com/e-mailidentifier&keyword&mailingidentifier&positiondata&maxnumber">

The process then moves to block 120 and block 122 of FIG. 2, to process the subsequent requests.

Turning back to block 204, if the received request is not the first request sent from the e-mail client, the process moves to block 220. The request is identified as a subsequent request, as the e-mail identifier and keyword from the subsequent sent back request define a key, that will match with a key in the key cache 53*a*. The now matched key in the key cache 53*a*, is then used to identify the corresponding listing in the listing cache 53*c*, and pull (retrieve) the requisite listing text corresponding to the particular request.

The process moves to block 222, where it is then determined if this request, from which the listing text was pulled from the listing cache 53*c*, is the last request of the total number of requests. This is accomplished by the following sub process.

Initially, in the e-mail sent to the e-mail client (the "sent e-mail"), the number of requests (N) in the e-mail, in particular the position data of the e-mail, has been stored in a cache, for example, the request cache 53*b*. The position data is associated with a key for each sent e-mail, as stored in the request cache 53*b*. The number of requests needing to be serviced for each sent e-mail corresponds to the number of listings returned from the requisite content server (CS) 34*a*-34*n*, for example the content server (CS) 34*a*. For the first request serviced, a reference counter in the Home Server (HS) 30 has been decremented by one (for example, N−1). For each subsequent request that is serviced, the reference counter is again decremented by one. Decrementing continues, until the reference counter reaches zero (for example, N=0), when the last request has been processed.

Accordingly, in block 222, if the request is not the last request, the reference counter has a value of greater than zero (for example, N>0). The process moves to block 230.

In block 230, the next listing of the listing text (in text form) corresponding to the specific request, is pulled from the listing cache 53*c*, and is passed from the Home Server (HS) 30 to the imaging server (IS) 38. The process then moves to block 232, as detailed above.

However, if at block 222, the request is the last request, the reference counter has been decremented to have a value of zero (N=0). The process moves to block 224. The listing text in the listing cache 53*c* is modified.

Modification typically occurs after the last request of the total number of requests (from block 124 of FIG. 2) has been received and processed. Modification of the listing cache 53*c* of listings therein typically involves deleting the listing text from the listing cache 53*c*.

This subprocess is typically timed, such that once the final listing from the listing cache 53*c* for this last request has been passed to the imaging server (IS) 38, from the Home Server (HS) 30, at block 230, the listing text is modified in the listing cache 53*c*. The modification typically includes deleting the listing text from the listing cache 53*c* in a time period, for example, once the connection or pipe between the e-mail client and the home server (HS) 30 closes, as the body of the e-mail is now complete (with the template having been filled), or in a predetermined time period. This predetermined time period is typically a default, and is approximately three hours from the time the first request of the total number of requests or N requests was processed.

With the process now at block 230, the final listing from the listing text is pulled from the listing cache 53*c*, in response to this last request, and is passed to the imaging server (IS) 38, as detailed above. Once the listing (in text form) has been passed to the imaging server (IS) 38, the process moves to block 232, and back to block 124 (FIG. 2), as detailed above. Since the last request (for example, the Nth request) has been processed, in FIG. 2, the process moves to block 126 (where the connection or "pipe" between the e-mail client and the home server (HS) 30 is closed), where the entire content for the e-mail has now been rendered to the e-mail client of the user 47, for placement into the now-opened e-mail.

Figure 9:
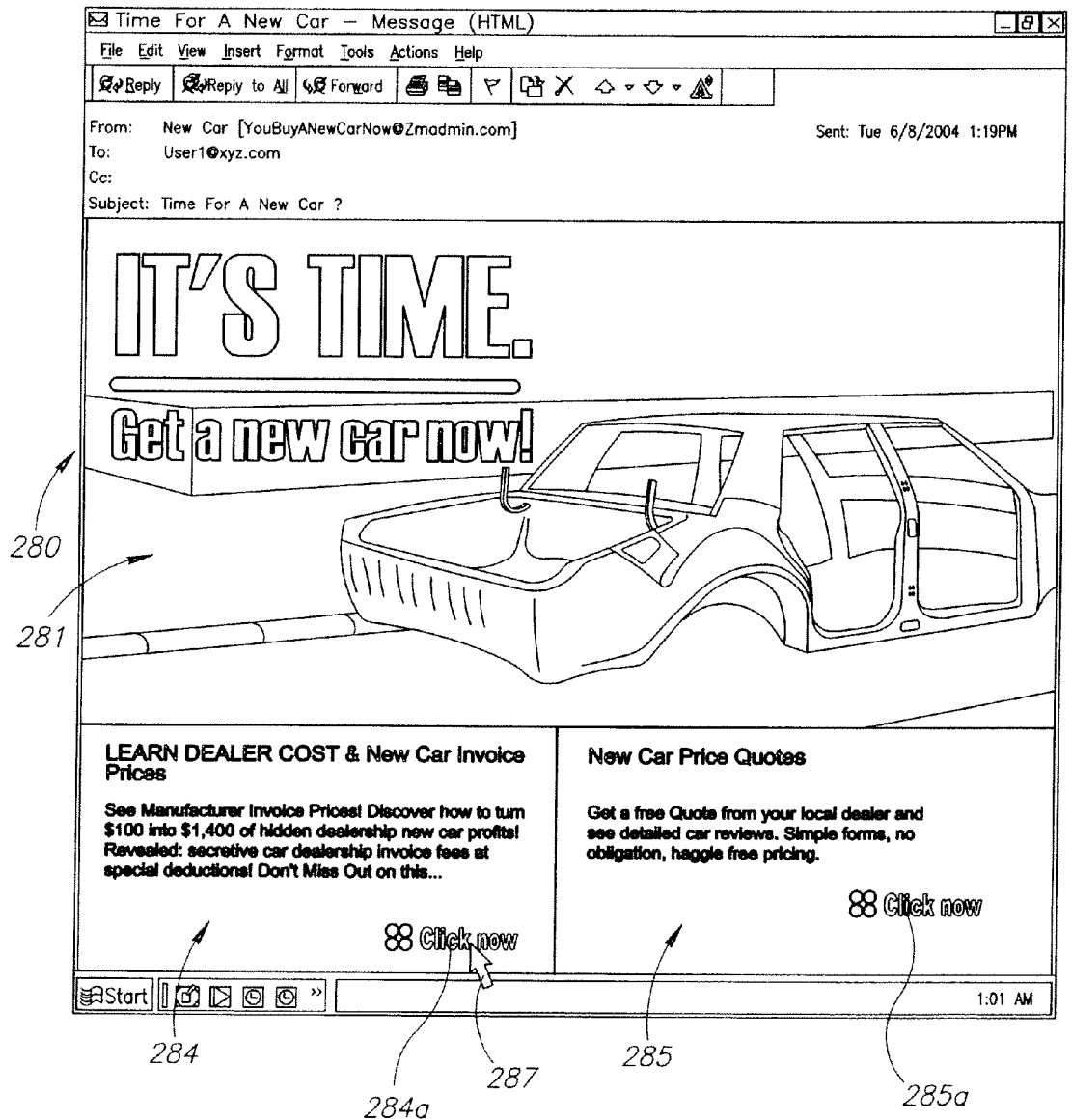
FIG. 9 is a screen shot of the text of e-mails received in accordance with the present invention.

Attention is now directed to FIG. 9, that shows a screen shot of an exemplary e-mail 280, created in accordance with the description above, after it has been opened (at time $t_1$, as detailed above). This e-mail 280 is used the example template 150 of FIG. 4, for its body. The e-mail 280 was formed from the listing text returned from the requisite content server (CS) 34*a*-34*n* and stored in the listing 53*c* and click 53*d* caches. The images 281 for the section S1 151 of the template 150, are from the imaging server (IS) 38, and are, for example, of an advertisement.

The image 281 is a static image, of a fixed or preprogrammed content, formed prior to the e-mail being sent. The images 284, 285 (in e-mail 280) for sections D1 161 and D2 162 of the template 150, were assembled when the e-mail was opened (in accordance with the processes detailed herein). These images 284, 285, include portions 284*a*, 285*a*, that cover links for the user to click on, and are indicated as such, for example, "Click now". (The portions 284*a*, 285*a* are hereafter referred to as links). These underlying links, are the click URLs for the corresponding positions, of the data strings, detailed above, and shown in FIG. 3B, placed into the e-mail by the home server (HS) 30, at block 106 (FIG. 2), above.

When these underlying links (the click URL's) are activated, typically by a mouse 49*b* click or other pointing device activation (for example, at a time $t_2$ subsequent to time $t_1$), the browser of the user 47 is provided with a redirect URL, directing the browser to a target web site (or web page). This web site (or web page) is from the listing that resulted in the image that supported the clicked link.

In operation, activating the link 284*a*, for example, by a mouse click (indicated by the arrow 287), directs the user's browser to the Home Server (HS) 30. From the data in the string, a click cache 53*d* may be accessed. By accessing the click cache 53*d*, the browser receives a redirect URL for a web site (or web page) (that is targeted). Once the redirect URL is active, the connection or pipe between the e-mail client and the home server (HS) 30 closes, and opens a connection or between the e-mail client and the server or the like, hosting the target web site (for example, third party servers 50*a*-50*n*), corresponding to the redirect URL.

Figure 10:
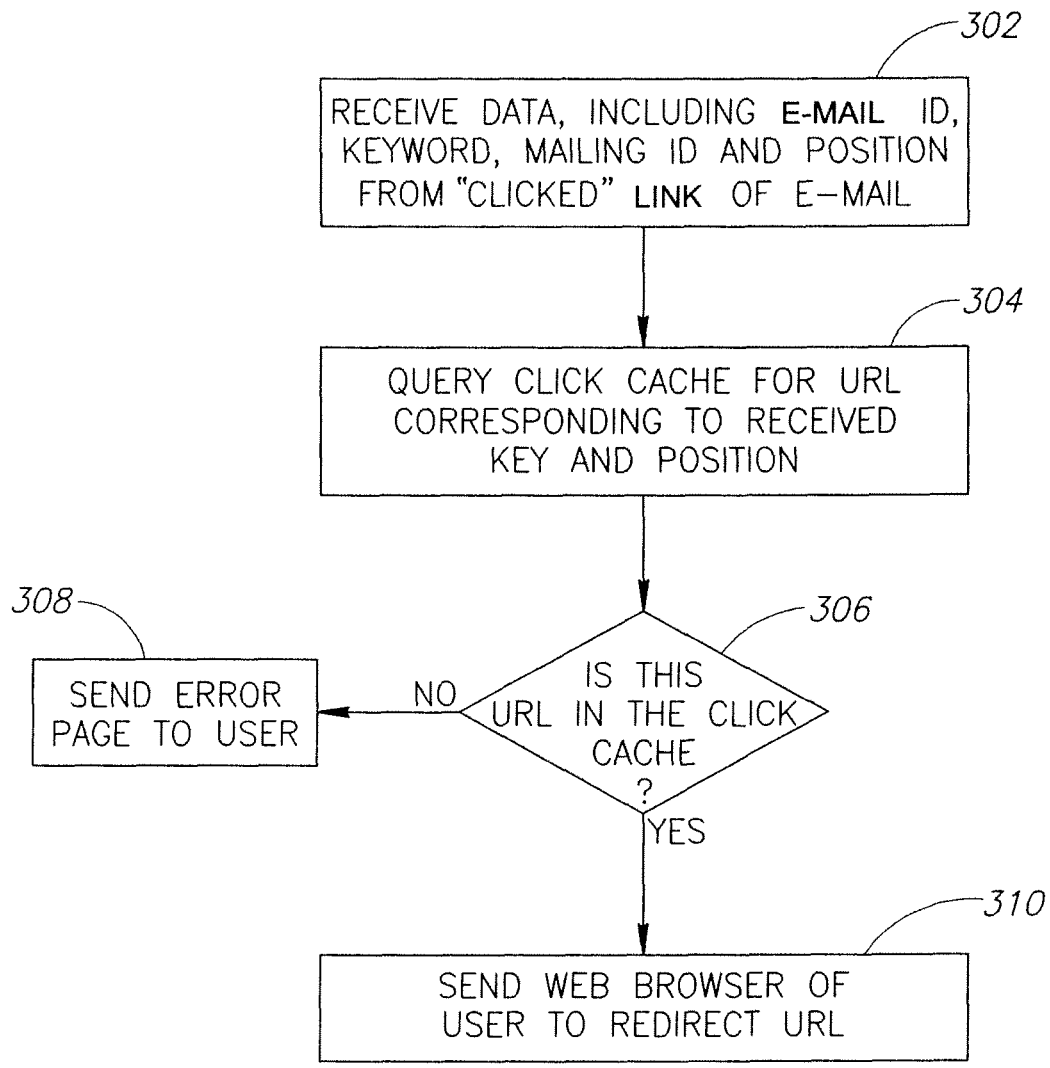
FIG. 10 is a flow diagram of a process for directing an e-mail recipient to an intended or target web site upon responding to an e-mail in accordance with an embodiment of the invention.

FIG. 10 shows a flow diagram of a process or method in accordance with another embodiment of the invention. This process may be a second phase of the larger process, where the user 47 (browsing application associated with the user 47) reaches the web site (or web page) (target web site or target web page) of provider of the time-relevant text (content).

Initially, the user 47, now having received the rendered images in the template for the now-opened e-mail, will "click" (indicated by the arrow 287) on an image 284, 285, or portion thereof, that supports a link, such as the links 284a, 285a of FIG. 9, to which reference is now also made. Each link, as discussed above, is associated with a string, that includes the requisite click URL. This click URL functions to initially direct the browsing application associated with the requisite user (e-mail recipient) to the home server (HS) 30. As stated previously, the click URL is, for example, a string, that includes a URL for the home server, an e-mail identifier (EID), keyword (KW), mailing identifier (MID) and position data (POS), and typically also includes the max number (N).

At block 302, the Home Server (HS) 30 receives data including an e-mail identifier, keyword, mailing identifier and position data (for the image location), (and typically a max number), typically in the above-described activated click URL, as a result of links 284a, 285a, of the text 284, 285, being clicked (indicated by the arrow 287) by the user 47 (activating their mouse 51, as shown in FIG. 1, at the desired link 284a, 285a). The click typically reopens a connection or pipe between the e-mail client of the user (e-mail recipient) and the home server (HS) 30. The Home Server (HS) 30 then creates a key from, for example, the e-mail identifier, the keyword, and the mailing identifier, and locates the matching key in the key cache 53a. With the matching key located, the corresponding key in the click cache 53d is located. The click cache 53d is queried for position data matching the position data of the string (of the link), in order to obtain a redirect URL for the particular position data, at block 304. It is then determined if the redirect URL is in the click cache, at block 306.

The redirect URL is a URL for the web site corresponding to the clicked text portion on the rendered e-mail, as programmed into the listed text in the click cache 53d. This URL is typically for a target web site or web page (content) on (or hosted by), for example, a third party server (TPS) 50a-50n.

Figure 11:
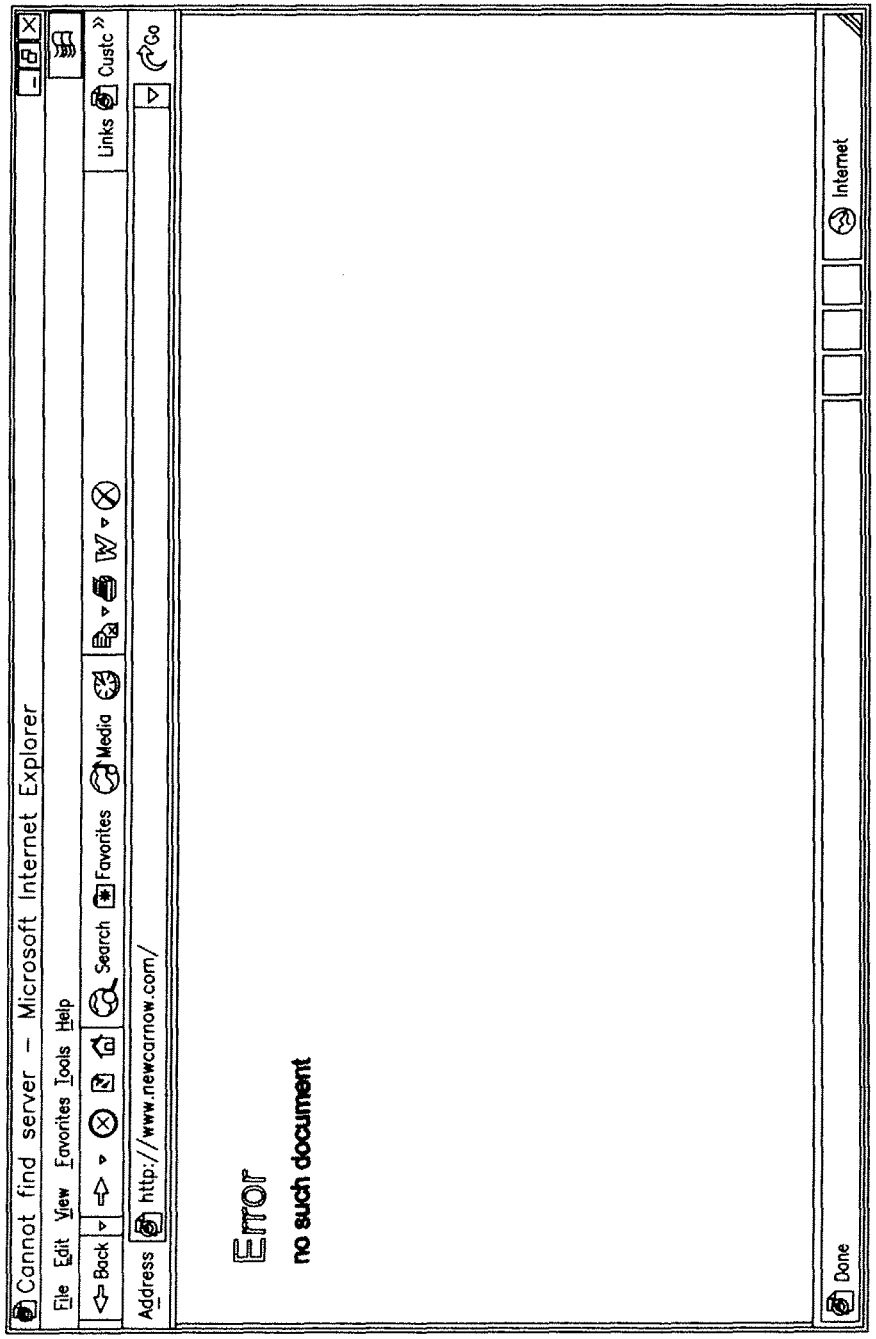
FIG. 11 is a screen shot showing an error or time out.

If the redirect URL is not in the click cache 53d, the user 47 is sent an error page, at block 308. This error page appears on the monitor 49a of the user 47 as, for example, the screen shot shown in FIG. 11.

However, if the redirect URL is in the click cache 53d (with the matching position data), the Home Server (HS) 30 sends the web browser of the user 47 the redirect URL at block 310. The user's web browser receives this redirect URL, and automatically accesses the web page (typically, a target web page) corresponding to the redirect URL.

Figure 12:
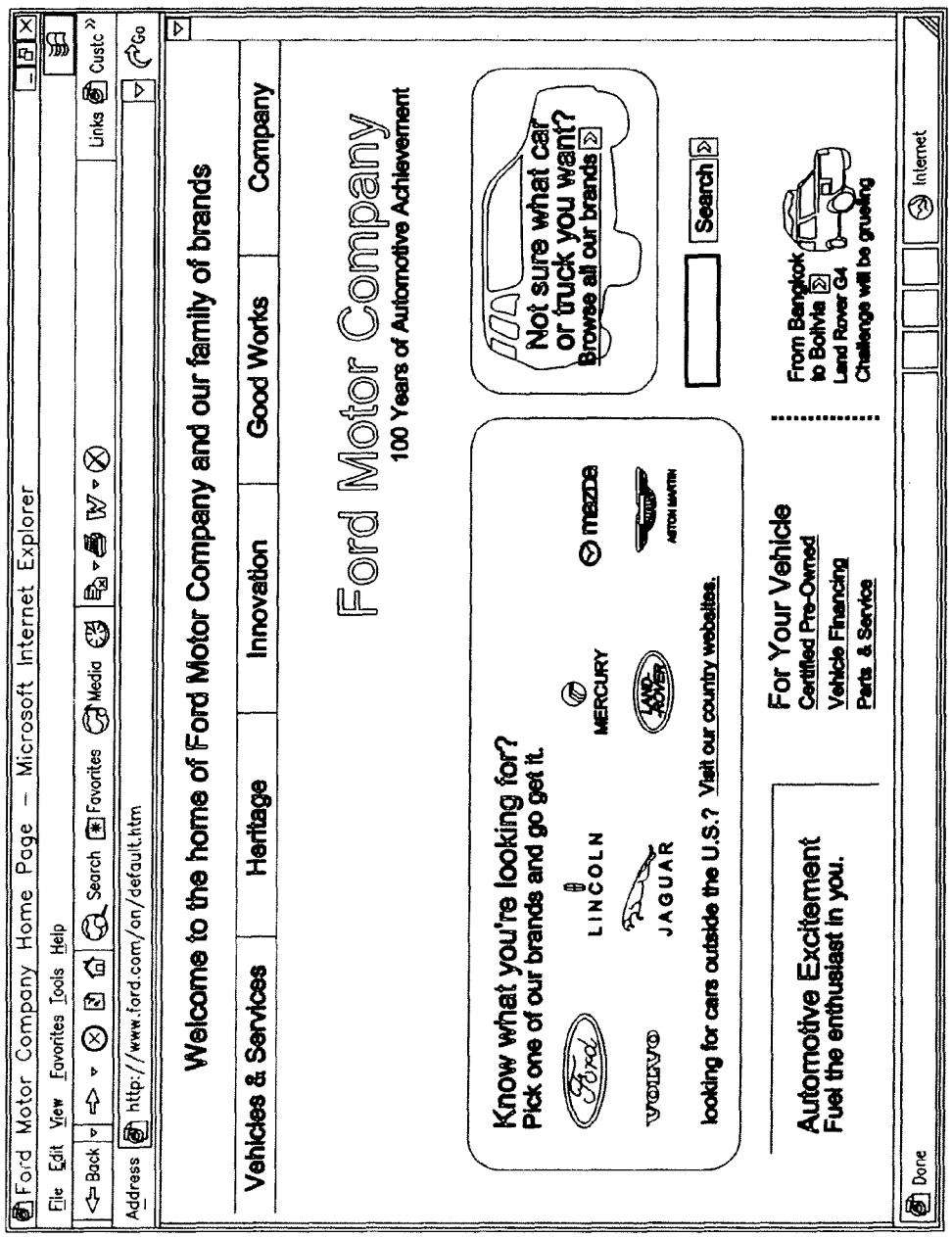
FIG. 12 is a screen shot showing a web page of a target web site accessed from a redirect uniform resource locator in accordance with an embodiment of the invention.

For example, the redirect URL (from KEY 1, position data POS=1 in the example click cache 53d of FIG. 8) may be "www.ford.com." In this case, the user's web browser would be directed to www.ford.com, whereby the web page, obtained at the address www.ford.com, shown in FIG. 12, would appear on the monitor 49a of the user. The server that hosts the site associated with www.ford.com may be any one or more of the third party servers (TPS) 50a-50n.

The click cache 53d is typically designed to expire once the connection or pipe between the e-mail client and the home server (HS) 30 closed (upon activation of the redirect URL). Typically, as a default, the click cache expires in a predetermined time period, for example, a time period that is less than the limit redirect timeouts (described for block 224 above). This time may be, for example, approximately two hours.

The above-described processes including portions thereof can be performed by software, hardware and combinations thereof. These processes and portions thereof can be performed by computers, computer-type devices, workstations, processors, micro-processors, other electronic searching tools and memory and other storage-type devices associated therewith. The processes and portions thereof can also be embodied in programmable storage devices, for example, compact discs (CDs) or other discs including magnetic, optical, etc., readable by a machine or the like, or other computer usable storage media, including magnetic, optical, or semiconductor storage.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

While preferred embodiments of the present invention have been described, so as to enable one of skill in the art to practice the present invention, the preceding description is intended to be exemplary only. It should not be used to limit the scope of the invention, which should be determined by reference to the following claims.

What is claimed is:

1. A computer-implemented method for providing time-relevant content into electronic communications over a network comprising:
   receiving, by a first computer system linked to the network, over the network, encrypted address data corresponding to a recipient for an electronic communication, the encrypted address data from a second computer system linked to the network;
   creating, by the first computer system, an electronic communication including the encrypted address data and a request for obtaining content, the request for obtaining content configured to be automatically transmitted from a terminal of the recipient of the electronic communication, over the network, when the electronic communication is opened, the terminal linked to the network;
   sending, by the first computer system, the electronic communication including the encrypted address data, for decryption to a decrypting computer device linked to the network and associated with the second computer system, over the network;
   receiving, by the first computer system, the request for obtaining content, that was automatically transmitted over the network, from the terminal of the recipient, when the electronic communication was opened; and
   responding, by the first computer system, to the received request for obtaining content that was automatically transmitted from the terminal of the recipient when the electronic communication was opened, including, assembling the content corresponding to the received request for obtaining content, to be provided to the opened electronic communication.

2. The computer-implemented method of claim 1, additionally comprising: the first computer system providing the content to the opened electronic communication.

3. The computer-implemented method of claim 2, wherein the assembling the content includes obtaining listings based on at least one key word, and providing redirect uniform locators to target web sites associated with each listing.

4. The computer-implemented method of claim 2, wherein the first computer system providing the content to the opened electronic communication includes:

opening a connection to a client associated with the recipient of the electronic communication, the client for sending and receiving electronic communications; and, sending the content to the opened electronic communication through the connection.

5. The computer-implemented method of claim 4, additionally comprising:

closing the connection when the content has been provided to the opened electronic communication.

6. The computer-implemented method of claim 5, wherein the client includes an e-mail client.

7. The computer-implemented method of claim 2, wherein the electronic communication includes a data string activatable by activating a link in the opened electronic communication, to open a connection between the terminal of the recipient and the first computer system, the data string including data for activating redirect uniform resource locators to direct the browsing application of the terminal of the recipient, when the recipient has activated the link, to one of the target web sites.

8. The computer-implemented method of claim 7, wherein the data string includes a click uniform resource locator, provided in the electronic communication, the click uniform resource locator including the address for the location of the redirect uniform resource locator, an electronic mail identifier, and a mailing identifier.

9. The computer-implemented method of claim 2, wherein the electronic communication includes electronic mail.

10. The computer-implemented method of claim 2, wherein the content is assembled and provided in real time, when the electronic communication is opened.

11. The computer-implemented method of claim 2, wherein the encrypted address data is encrypted with a one-way encryption application.

12. The computer-implemented method of claim 2, wherein the encrypted address data is encrypted with a two-way encryption application.

13. The computer-implemented method of claim 3, wherein the assembling the content includes obtaining text from the listings and converting the text into images for placement into the opened electronic communication.

14. The computer-implemented method of claim 1, wherein the network includes the Internet.

15. A system for providing time-relevant content into electronic communications over a network comprising:

at least one first computer device for linking to the network, configured for:

receiving over the network, encrypted address data corresponding to a recipient for an electronic communication, the encrypted address data from a second computer system linked to the network:

creating an electronic communication including the encrypted address data and a request for obtaining content, the request for obtaining content configured to be automatically transmitted from a terminal of the recipient of the electronic communication, over the network, when the electronic communication is opened, the terminal linked to the network;

sending the electronic communication including the encrypted address data, for decryption to a decrypting computer device linked to the network and associated with the second computer system, over the network;

receiving the request for obtaining content, that was automatically transmitted over the network, from the terminal of the recipient, when the electronic communication was opened; and responding to the received request for obtaining content, that was automatically transmitted from the terminal of the recipient when the electronic communication was opened, including, assembling the content corresponding to the received request for obtaining content, to be provided to the opened electronic communication.

16. The system of claim 15, wherein the at least one first computer device is additionally configured for providing the content to the opened electronic communication.

17. The system of claim 16, wherein the at least one computer device is further configured for assembling the content including: obtaining listings based on at least one key word, and providing redirect uniform locators to target web sites associated with each listing.

18. The system of claim 17, additionally comprising, at least one second computer device linked to the network and configured for obtaining text from the listings and converting the text into images for placement into the opened electronic communication.

19. A system for providing time-relevant content into electronic communications over a network comprising:

at least one server computing device comprising:

a storage medium for storing computer components; and a processor for executing the computer components comprising:

a first component configured for receiving over the network, encrypted address data corresponding to a recipient for an electronic communication, the encrypted address data from a second computer system linked to the network:

a second component configured for creating an electronic communication including the encrypted address data and a request for obtaining content, the request for obtaining content configured to be automatically transmitted from a terminal of the recipient of the electronic communication, over the network, when the electronic communication is opened, the terminal linked to the network;

a third component configured for sending the electronic communication including the encrypted address data, for decryption to a decrypting computer device linked to the network and associated with the second computer system, over the network;

a fourth component configured for receiving the request for obtaining content, that was automatically transmitted over the network, from the terminal of the recipient, when the electronic communication was opened; and a fifth component configured for responding to the received request for obtaining content, that was automatically transmitted from the terminal of the recipient when the electronic communication was opened, including, assembling the content corresponding to the received request for obtaining content, to be provided to the opened electronic communication.

20. The system of claim 19, additionally comprising: a sixth component configured for providing the content to the opened electronic communication.

21. The system of claim 20, wherein the fifth component is further configured for assembling the content by obtaining listings based on at least one key word, and providing redirect uniform locators to target web sites associated with each listing.

22. The system of claim 21, additionally comprising: a seventh component configured for obtaining text from the listings and converting the text into images for placement into the opened electronic communication.

23. A computer system for providing time-relevant content into electronic communications over a network comprising:
   at least one first computer device linked to the network, the at least one computer device comprising:
      means for receiving, encrypted address data corresponding to a recipient for an electronic communication, from the network, the encrypted address data from a second computer system linked to the network:
      means for creating an electronic communication including the encrypted address data and a request for obtaining content, the request for obtaining content configured to be automatically transmitted from a terminal of the recipient of the electronic communication, over the network, when the electronic communication is opened, the terminal linked to the network;
      means for sending the electronic communication including the encrypted address data, for decryption to a decrypting computer device linked to the network and associated with the second computer system, over the network;
      means for receiving the request for obtaining content, that was automatically transmitted over the network, from the terminal of the recipient, when the electronic communication was opened; and
      means for responding to the received request for obtaining content, that was automatically transmitted from the terminal of the recipient when the electronic communication was opened, including, assembling the content corresponding to the received request for obtaining content, to be provided to the opened electronic communication.

24. The computer system of claim 23, additionally comprising: means for providing the content to the opened electronic communication.

25. The computer system of claim 24, additionally comprising: at least one second computer device linked to the network, the at least one second computer device including means for converting content obtained as text into images for being provided to the opened electronic communication.

* * * * *